(12) United States Patent
Wolfe et al.

(10) Patent No.: US 9,584,750 B2
(45) Date of Patent: Feb. 28, 2017

(54) ADAPTIVE ADJUSTMENT OF THE OPERATING BIAS OF AN IMAGING SYSTEM

(71) Applicant: Seek Thermal, Inc., Santa Barbara, CA (US)

(72) Inventors: Jason Wolfe, Santa Barbara, CA (US); Willliam J. Parrish, Santa Barbra, CA (US)

(73) Assignee: Seek Thermal, Inc., Santa Barbara, CA (US)

( * ) Notice: Subject to any disclaimer, the term of this patent is extended or adjusted under 35 U.S.C. 154(b) by 0 days.

(21) Appl. No.: 14/829,500

(22) Filed: Aug. 18, 2015

(65) Prior Publication Data

US 2016/0057369 A1 Feb. 25, 2016

Related U.S. Application Data

(60) Provisional application No. 62/039,566, filed on Aug. 20, 2014.

(51) Int. Cl.
*H04N 5/378* (2011.01)
*H04N 5/33* (2006.01)
(Continued)

(52) U.S. Cl.
CPC ............... *H04N 5/378* (2013.01); *G01J 5/20* (2013.01); *G01J 5/22* (2013.01); *H04N 5/33* (2013.01);
(Continued)

(58) Field of Classification Search
CPC ........ H04N 5/378; H04N 5/3765; H04N 5/33; H04N 5/353; H04N 5/3655;
(Continued)

(56) References Cited

U.S. PATENT DOCUMENTS 5,200,623 A 4/1993 Cannata
6,140,948 A 10/2000 Yu
(Continued)

FOREIGN PATENT DOCUMENTS

EP 1 083 740 3/2001
EP 1 601 185 11/2005
(Continued)

OTHER PUBLICATIONS

PCT International Search Report and Written Opinion for PCT/US2015/032671 mailed Sep. 7, 2015 in 16 pages.
(Continued)

*Primary Examiner* — Pritham Prabhakher
(74) *Attorney, Agent, or Firm* — Knobbe Martens Olson & Bear LLP

(57) ABSTRACT

An imaging system includes a shutter, an array of photodetectors, and electronic circuitry associated with the photodetectors to read intensity values from the photodetectors, the electronic circuitry including elements configured to provide an operating bias point of the photodetectors. The imaging system includes components, such as a controller, configured to adaptively adjust the operating bias for the photodetectors wherein the adjustment is based at least in part on intermittent measurement of a flat field image. During use, the imaging system can be configured to perform intermittent adjustments of the operating bias based on changes in photodetector values for intermittently acquired flat field images. Adjustment of the operating bias may provide compensation for drift over time of the photodetectors and/or electronics due to effects including but not limited to temperature changes.

15 Claims, 10 Drawing Sheets

(51) Int. Cl.
*H04N 5/353* (2011.01)
*H04N 5/376* (2011.01)
*G01J 5/20* (2006.01)
*G01J 5/22* (2006.01)
*H04N 5/365* (2011.01)

(52) U.S. Cl.
CPC .......... *H04N 5/353* (2013.01); *H04N 5/3655* (2013.01); *H04N 5/3765* (2013.01)

(58) Field of Classification Search
CPC .......... H04N 5/23229; H04N 5/23293; H04N 5/3651; H04N 5/357; H04N 5/3656; H04N 9/04; H04N 9/64; H04N 1/465; G01J 5/20; G01J 5/22; G01J 5/30; G01J 5/0834; G01J 5/522; G01J 5/025; G01J 2005/0081; G01J 2005/0048; G01J 2005/0077; G06T 5/002; G06T 5/20; G06T 5/40; G06T 2207/20021; G06T 2207/10048
USPC .................................................. 348/294
See application file for complete search history.

(56) References Cited

U.S. PATENT DOCUMENTS

| | | | |
|---|---|---|---|
| 6,252,995 B1 | 6/2001 | Takamori | |
| 6,274,869 B1* | 8/2001 | Butler | G01J 5/061 250/252.1 |
| 6,730,909 B2 | 5/2004 | Butler | |
| 7,592,577 B1* | 9/2009 | Liu | H01L 27/14643 250/208.1 |
| 7,772,557 B2* | 8/2010 | Anderson | H04N 5/33 250/252.1 |
| 7,795,578 B2 | 9/2010 | Högasten et al. | |
| 7,796,168 B1 | 9/2010 | Kostrzewa et al. | |
| 7,982,652 B2 | 7/2011 | Simony et al. | |
| 7,995,859 B2 | 8/2011 | Högasten | |
| 8,189,050 B1 | 5/2012 | Hughes et al. | |
| 8,208,026 B2 | 6/2012 | Högasten et al. | |
| 8,208,755 B1 | 6/2012 | Högasten | |
| 8,306,275 B2 | 11/2012 | Högasten | |
| 8,340,414 B2 | 12/2012 | Högasten et al. | |
| 8,373,757 B1 | 2/2013 | Nguyen | |
| 8,378,290 B1 | 2/2013 | Speake et al. | |
| 8,428,385 B2 | 4/2013 | Whiteside et al. | |
| 8,737,760 B2 | 5/2014 | Olsson et al. | |
| 8,780,208 B2 | 7/2014 | Högasten et al. | |
| 9,332,186 B2 | 5/2016 | Johansson et al. | |
| 9,335,352 B2 | 5/2016 | McCrea et al. | |
| 9,380,245 B1* | 6/2016 | Guidash | H04N 5/3696 |
| 2002/0022938 A1* | 2/2002 | Butler | G01J 5/061 702/85 |
| 2002/0074499 A1* | 6/2002 | Butler | G01J 5/10 250/338.1 |
| 2006/0092297 A1 | 5/2006 | Lee et al. | |
| 2008/0302956 A1* | 12/2008 | Anderson | H04N 5/33 250/252.1 |
| 2009/0073278 A1 | 3/2009 | Ogawa et al. | |
| 2010/0019128 A1* | 1/2010 | Itzler | H01L 27/14649 250/208.1 |
| 2010/0141768 A1 | 6/2010 | Liberman et al. | |
| 2010/0238294 A1 | 9/2010 | Högasten et al. | |
| 2011/0141368 A1 | 6/2011 | Wallace et al. | |
| 2011/0248699 A1* | 10/2011 | Lee | H05B 33/0815 324/98 |
| 2013/0064449 A1 | 3/2013 | Menikoff | |
| 2013/0147966 A1 | 6/2013 | Kostrzewa et al. | |
| 2013/0169819 A1 | 7/2013 | Strandemar | |
| 2013/0222604 A1 | 8/2013 | Ingerhed et al. | |
| 2013/0300875 A1 | 11/2013 | Strandemar et al. | |
| 2014/0015921 A1 | 1/2014 | Foi et al. | |
| 2014/0016879 A1 | 1/2014 | Högasten et al. | |
| 2014/0037225 A1 | 2/2014 | Högasten et al. | |
| 2014/0092257 A1 | 4/2014 | Högasten et al. | |
| 2014/0092258 A1 | 4/2014 | Dart et al. | |
| 2014/0168445 A1 | 6/2014 | Högasten et al. | |
| 2014/0239180 A1* | 8/2014 | Vilain | G01J 5/20 250/338.4 |
| 2014/0247365 A1 | 9/2014 | Gardner et al. | |
| 2014/0313343 A1 | 10/2014 | Frank et al. | |
| 2014/0313385 A1 | 10/2014 | Sato et al. | |
| 2014/0355902 A1 | 12/2014 | Olsson | |
| 2014/0355904 A1 | 12/2014 | Olsson | |
| 2015/0085134 A1* | 3/2015 | Novotny | H04N 5/3535 348/164 |
| 2015/0187144 A1 | 7/2015 | Roth | |
| 2015/0310594 A1 | 10/2015 | Olsson | |
| 2015/0312488 A1 | 10/2015 | Kostrzewa et al. | |
| 2015/0312489 A1 | 10/2015 | Hoelter et al. | |
| 2015/0319379 A1 | 11/2015 | Nussmeier et al. | |
| 2015/0350567 A1 | 12/2015 | Parrish et al. | |
| 2016/0041039 A1 | 2/2016 | Olsson | |
| 2016/0042500 A1 | 2/2016 | Engberg et al. | |
| 2016/0044306 A1 | 2/2016 | Chahine et al. | |
| 2016/0056785 A1 | 2/2016 | Wolfe et al. | |
| 2016/0057369 A1 | 2/2016 | Wolfe et al. | |
| 2016/0156858 A1 | 6/2016 | Lee et al. | |
| 2016/0198102 A1 | 7/2016 | Chahine et al. | |
| 2016/0202117 A1 | 7/2016 | Hosking | |
| 2016/0203694 A1 | 7/2016 | Högasten et al. | |

FOREIGN PATENT DOCUMENTS

| | | |
|---|---|---|
| EP | 1667 066 | 6/2006 |
| EP | 2 618 560 | 7/2013 |
| EP | 2 645 577 | 10/2013 |
| WO | WO 2013/084809 | 6/2013 |
| WO | WO 2013/191611 | 12/2013 |
| WO | WO 2014/106210 | 7/2014 |

OTHER PUBLICATIONS

PCT International Search Report and Written Opinion for PCT/US042826 mailed Oct. 16, 2015 in 12 pages.
PCT International Search Report and Written Opinion for PCT/US043547 mailed Oct. 9, 2015 in 11 pages.
PCT International Search Report and Written Opinion for PCT/US045656 mailed Oct. 21, 2015 in 12 pages.
Badamchizadeh, et al., Image and Graphics, Comparative Study of Unsharp Masking Methods for Image Enhancement, 2004, pp. 27-30.
PCT International Search Report and Written Opinion for PCT/US2015/063111 mailed May 17, 2016 in 13 pages.
Branchitta, et al. Dynamic-range compression and contrast enhancement in infrared imaging systems, Optical Engineering Jul. 2008.

\* cited by examiner

ADAPTIVE ADJUSTMENT OF THE OPERATING BIAS OF AN IMAGING SYSTEM

CROSS-REFERENCE TO RELATED APPLICATIONS

This application claims the benefit of priority from U.S. Prov. App'n No. 62/039,566, filed Aug. 20, 2014, entitled "Adaptive Adjustment of the Operating Bias of an Imaging System," which is incorporated by reference herein in its entirety.

BACKGROUND

Field

The present disclosure generally relates to adaptive adjustment of an operating bias for imaging systems, such as cameras including infrared cameras for thermal imaging systems, and in particular to systems and methods for adjusting operating biases for photodetectors to compensate for behavioral changes over time.

Description of Related Art

The increasing availability of high-performance, low-cost uncooled infrared imaging devices, such as bolometer focal plane arrays (FPAs), is enabling the design and production of mass-produced, consumer-oriented infrared (IR) cameras capable of quality thermal imaging. Such thermal imaging sensors have long been expensive and difficult to produce, thus limiting the employment of high-performance, long-wave imaging to high-value instruments, such as aerospace, military, or large-scale commercial applications. Mass-produced IR cameras may have different design requirements than complex military or industrial systems. New approaches to image correction for effects such as temperature drift may be desirable for low-cost, mass-produced systems.

SUMMARY

Example embodiments described herein have innovative features, no single one of which is indispensable or solely responsible for their desirable attributes. Without limiting the scope of the claims, some of the advantageous features will now be summarized.

Some embodiments of an imaging system include a shutter, an array of photodetectors, and electronic circuitry associated with the photodetectors to read intensity values from the photodetectors, the electronic circuitry including elements configured to provide an operating bias point of the photodetectors. The imaging system can include components, such as a controller, configured to adaptively adjust the operating bias for the photodetectors wherein the adjustment is based at least in part on image data of a flat field scene acquired intermittently. During use, the imaging system can be configured to perform intermittent adjustments of the operating bias based on changes in photodetector values for acquired flat field images. Adjustment of the operating bias may provide compensation for drift over time of the photodetectors and/or electronics due to effects including but not limited to temperature changes.

In a first aspect, a method is provided for adaptive adjustment of operating biases of photodetectors of an imaging system. The imaging system includes a shutter, an array of photodetectors, and detector electronic circuitry for reading out image data from the array of photodetectors. The method includes acquiring, with the shutter closed to occlude the array of photodetectors, image data from the array of photodetectors during a first time period, the image data comprising an array of pixel values. The method includes adjusting operating bias points for individual pixels, wherein an adjusted operating bias point for an individual pixel is configured to adjust image data acquired with the shutter closed so that a pixel value from the individual pixel is within a threshold range around a data value assigned to a reference bias point. The method includes acquiring, with the shutter open to expose the array of photodetectors, image data of a scene at a time after the first time period, the image data acquired using the adjusted operating bias points. The method includes acquiring, with the shutter closed to occlude the array of photodetectors, image data from the array of photodetectors during a second time period after the first time period, the image data comprising an array of pixel values. The method includes re-adjusting the operating bias points for individual pixels with pixel values outside the threshold range, wherein a re-adjusted operating bias point for an individual pixel is configured to adjust image data acquired with the shutter closed so that a pixel value from the individual pixel is within the threshold range around the data value assigned to the reference bias point. The method includes acquiring, with the shutter open to expose the array of photodetectors, image data of a scene at a time later after the second time period, the image data acquired using the re-adjusted operating bias points.

In some embodiments of the first aspect, the method also includes repeating the steps of acquiring image data with the shutter closed, re-adjusting the operating bias points for individual pixels, and acquiring image data with the shutter open using re-adjusted operating bias points. In some embodiments of the first aspect, the method also includes converting image data to digital image data.

In some embodiments of the first aspect, adjusting an operating bias point includes adjusting at least one component in a resistor digital-to-analog converter ("RDAC") network such that a finest adjustment level corresponds to a change of one least significant bit in the RDAC network. In a further embodiment, re-adjusting an operating bias point includes adjusting the RDAC such that image data acquired with the shutter closed approaches the data value assigned to the reference bias point. In a further embodiment, the method also includes adjusting the RDAC such that image data acquired with the shutter closed approaches the data value assigned to the reference bias point, wherein image data that is above the threshold range is reduced to be less than the data value assigned to the reference bias point and image data that is below the threshold range is adjusted to be greater than the data value assigned to the reference bias point, such that a pixel value acquired with the adjusted RDAC settings is within one-half of the least significant bit in the RDAC network from the data value assigned to the reference bias point.

In a second aspect, an imaging system is provided that includes an imaging array comprising an infrared focal plane array, the infrared focal plane array comprising an array of microbolometers, each pixel of the focal plane array including a microbolometer photodetector. The imaging system also includes a detector circuit having a positive voltage rail; a negative voltage rail; at least one variable resistor network; an integrator with a signal input electrically coupled to an output of a microbolometer, a reference input electrically coupled to a integrator bias voltage source, and an output; and an analog-to-digital converter electrically coupled to the output of the integrator and configured to output digital data corresponding to an output signal of the integrator. The imaging system also includes a shutter configured to occlude the imaging array in a closed position and to expose the imaging array in an open position. The imaging system also includes a system controller configured to adjust the variable resistor network to set an operating bias of the detector circuit using image data acquired when the shutter is in the closed position. An individual microbolometer is electrically coupled to the positive voltage rail, the negative voltage rail, the at least one variable resistor network, and the integrator. The system controller is configured to adjust and re-adjust operating biases of individual photodetectors so that pixel values are within a targeted threshold that includes a reference bias level, the reference bias level corresponding to a targeted digital output value of an analog to digital conversion of the integrator output value when image data is acquired with the shutter closed.

In some embodiments of the second aspect, the at least one variable resistor network comprises a resistor digital-to-analog converter ("RDAC") network such that a finest adjustment level corresponds to a change of one least significant bit in the RDAC network. In a further embodiment, the system controller is configured to determine initial operating bias points for individual photodetectors by setting each element of the at least one variable resistor network to adjust image data acquired with the shutter closed to be closer to the reference bias level. In a further embodiment, the system controller is configured to re-adjust the operating bias points by adjusting only the RDAC network to bring the image data acquired with the shutter closed closer to the reference bias level. In yet a further embodiment, the system controller is further configured to adjust the RDAC network to bring the image data acquired with the shutter closed for individual pixels closer to the reference bias level, wherein image data that is above a threshold range is reduced to be less than the reference bias level and image data that is below the threshold range is adjusted to be greater than the reference bias level. In a further embodiment, at a plurality of points in time when the shutter is closed, the imaging system controller is configured to acquire multiple frames of image data, and analyze the acquired frames of image data based on previous RDAC settings and current RDAC settings. In yet a further embodiment, the system controller is configured to determine an average of a number frames of image data.

In some embodiments of the second aspect, the imaging system is a thermal imaging system and image data acquired with the shutter closed comprises a substantially uniform temperature scene at a temperature of the shutter. In a further embodiment, the imaging system comprises an infrared camera core.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
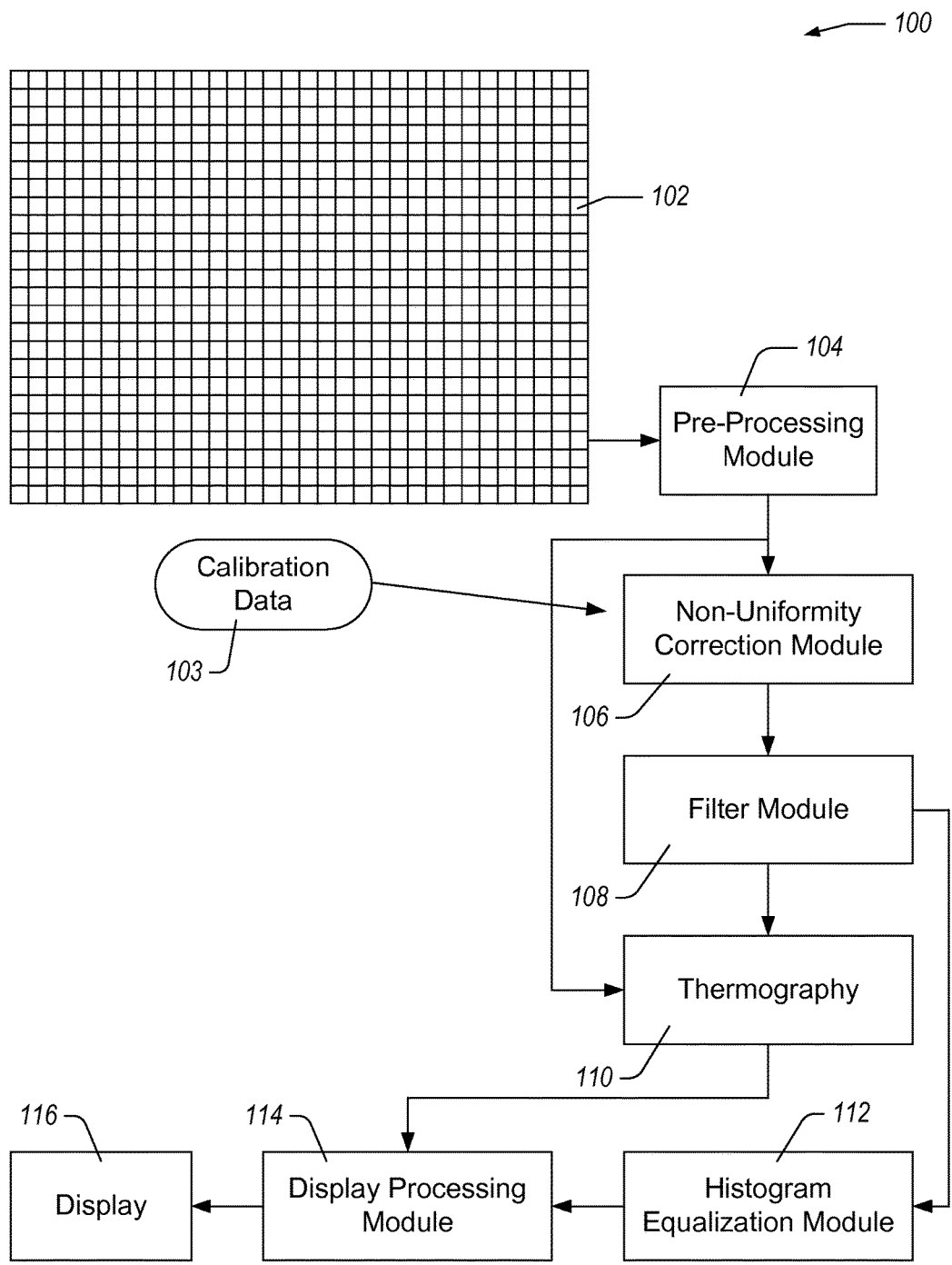
FIG. 1A illustrates a functional block diagram of an example imaging system.

Generally described, aspects of the present disclosure relate to using flat field image data (e.g., image data acquired while a shutter is closed) to adjust operating biases of photodetectors in an imaging array of an imaging system. This can be done to adjust for photodetector values drifting over time, for example. The present disclosure includes systems and methods to adjust operating biases to account for photodetectors that output values for a flat field image that change over time due at least in part to temperature changes at the imaging array. To account for these changing values, the systems and methods disclosed herein acquire flat field data at a plurality of times to determine whether individual photodetector responses have drifted outside of a targeted range. If an individual photodetector value has drifted outside the targeted range, the imaging system can adjust its operating bias so that its output is within the targeted range. Thus, in some embodiments, these systems and methods can compensate for changing photodetector responses over time by adjusting hardware components of the imaging system. Advantageously, this can allow the imaging system to intermittently monitor and adjust photodetector responses to flat field image data during use. These adjustments can, for example, ensure that the operating ranges or dynamic ranges of the photodetectors remain within an acceptable or targeted range.

Although examples and implementations described herein focus, for the purpose of illustration, on implementation in an infrared camera core using a focal plane array with microbolometers, the systems and methods disclosed herein can be implemented in digital and/or video cameras that acquire visible light using a variety of image sensors. Similarly, the imaging systems described herein can be implemented with different shuttering systems. Various aspects of the disclosure will now be described with regard to certain examples and embodiments, which are intended to illustrate but not limit the disclosure.

Some embodiments described herein provide adaptive adjustment of operating biases for photodetectors to compensate for drift in responses of photodetectors in imaging circuits, where the drift may be caused at least in part by variations in temperature over time. Advantageously, the disclosed adaptive adjustment methods can be applied to hardware components, such as electronic circuitry, to compensate for variations in photodetector output during use.

Some embodiments described herein provide ongoing adaptive adjustment of operating biases under control of a system controller in an imaging system. Advantageously, the imaging system can apply adjustments to individual photodetectors within an imaging array using the system controller. Similarly, the imaging system can apply adjustments to rows or columns in an imaging array as well as to an entire array of photodetectors using different circuit components.

Some embodiments described herein acquire intermittent image frames of a flat field scene (e.g., an image acquired with a closed shutter) to determine adjustments of individual photodetector operating biases. Advantageously, this allows the imaging system to monitor and correct for drifts in individual photodetector responses over time during usage. The imaging system can be configured to acquire flat field images relatively quickly to reduce or minimize interruptions to normal or typical image acquisition. The imaging system can be configured to acquire flat field images with relatively long periods of time between acquisitions to reduce or minimize interruptions to normal or typical image acquisition.

Some embodiments described herein include delivering prior image frames acquired with operating bias adjustments and current image frames acquired with operating bias adjustments to a system controller to be used for drift trend prediction, such prediction used in conjunction with non-uniformity correction, for example. In certain implementations, image frames acquired at a first time can be compared to image frames acquired at a second time, later than the first time, and the system controller can be configured to determine the amount of drift of individual photodetectors and/or to determine a trend in the offset as a function of time wherein the image frames acquired at the first time and the second time utilize the same settings for operating biases. The system controller can be configured to receive image frames acquired at a plurality of times to determine the drift trend prediction, wherein the system controller receives information about the operating bias settings associated with the received image frames.

The disclosed methods for adaptive adjustment of operating biases may be implemented as modules that may be a programmed computer method or a digital logic method and may be implemented using a combination of any of a variety of analog and/or digital discrete circuit components (transistors, resistors, capacitors, inductors, diodes, etc.), programmable logic, microprocessors, microcontrollers, application-specific integrated circuits, or other circuit elements. A memory configured to store computer programs or computer-executable instructions may be implemented along with discrete circuit components to carry out one or more of the methods described herein. In certain implementations, the disclosed methods may be implemented in conjunction with a focal plane array (FPA) on a camera core, wherein the processor and memory components executing the disclosed methods may be on a device mated to the camera core, such as a mobile appliance including smart phones, tablets, personal computers, etc. In some implementations, the processing and memory elements of the imaging system may be in programmable logic or on-board processors that are part of the core or camera system. In some embodiments, image frame acquisition and operating bias adjustment may be accomplished on a processing element on the camera core, and further image processing and display may be accomplished by a system controller mated to the core.

As a particular example of some advantages provided by the disclosed systems and methods, an imaging system can include a focal plane array (FPA) configured to acquire images of a scene. The FPA can include a two-dimensional array of N detectors, the FPA configured to output a two-dimensional image of the scene. For imaging purposes, image frames, typically data from all or some of the detectors $N_f$, are produced by the FPA, each successive frame containing data from the array captured in successive time windows. Thus, a frame of data delivered by the FPA comprises $N_f$ digital words, each word representing a particular pixel, P, in the image. These digital words are usually of a length determined by the analog to digital conversion (A/D) process. For example, if the pixel data is converted with a 14 bit A/D, the pixel words may be 14 bits in length, and there may be 16384 counts per word. For an IR camera used as a thermal imaging system, these words may correspond to an intensity of radiation measured by each pixel in the array. In a particular example, for a bolometer IR FPA the intensity per pixel usually corresponds to temperature of the corresponding part of the imaged scene, with lower values corresponding to colder regions and higher values to hotter regions. It may be desirable to display this data on a visual display.

Each pixel in an FPA may include a radiation detector that generates relatively small signals in response to detected radiation, such as in an infrared imaging array. These signals may be relatively small compared to signals or signal levels in the FPA arising from sources not caused by incident radiation, or non-image signals, wherein these non-image signals are related to the materials, structure, and/or components of the FPA. For example, pixels in an FPA can include interface circuitry including resistor networks, transistors, and capacitors on a readout integrated circuit (ROIC) that may be directly interfaced to the array of detectors. For instance, a microbolometer detector array, a microelectrical mechanical system (MEMS) device, may be manufactured using a MEMS process. The associated ROIC, however, may be fabricated using electronic circuit techniques. These two components can be combined together to form the FPA. The combination of the interface circuitry and the detector itself may have offset and temperature behaviors that are relatively large compared to the signals produced in response to incident radiation on the detectors. Thus, it is often desirable to compensate for these effects that are not related to the image signal before displaying or otherwise processing the image data.

Example Imaging Systems

FIG. 1A illustrates a functional block diagram of an imaging system 100 comprising an image sensor such as a focal plane array 102, a pre-processing module 104, a non-uniformity correction module 106, a filter module 108, a thermography module 110, a histogram equalization module 112, a display processing module 114, and a display 116. The focal plane array 102 can output a sequence of frames of intensity data (e.g., images, thermal images, etc.). Each frame can include an array of pixel values, each pixel value representing light intensity detected by a corresponding pixel on the focal plane array 102. The pixel values can be read out of the focal plane array 102 as a stream of serial digital data. In some embodiments, the pixel values are read out of the focal plane array 102 using read out electronics that process whole rows or whole columns of the focal plane array 102. The format of the stream of data can be configured to conform to a desired, standard, or pre-defined format. The stream of digital data can be displayed as a two-dimensional image, such as by the display 116.

In some embodiments, the focal plane array 102 can be an array of microbolometers integrated with a readout integrated circuit ("ROIC"). The array of microbolometers can be configured to generate electrical signals in response to a quantity of thermal radiation or a temperature. The ROIC can include buffers, integrators, analog-to-digital converters, timing components, and the like to read the electrical signals from the array of microbolometers and to output a digital signal (e.g., 14-bit serial data separated into image frames). Additional examples of systems and methods associated with the focal plane array 102 are disclosed in U.S. patent application Ser. No. 14/292,124, entitled "Data Digitization and Display for an Imaging System," filed May 30, 2014, the entire contents of which is incorporated by reference herein.

The focal plane array 102 can have calibration or other monitoring information associated with it (e.g., calibration data 103) that can be used during image processing to generate a superior image. For example, calibration data 103 may include bad pixel maps, and/or gain tables stored in data storage and retrieved by modules in the imaging system 100 to correct and/or adjust the pixel values provided by the focal plane array 102. Calibration data 103 may include gain tables. As described herein, the focal plane array 102 can include a plurality of pixels with integrated readout electronics. The readout electronics can have a gain associated with it, wherein the gain may be proportional to the transimpedance of a capacitor in the electronics. This gain value, which may in some implementations take the form of a pixel gain table, may be used by the image processing modules of the imaging system 100. Additional examples of calibration data for the imaging system 100 are provided in U.S. Prov. App'n No. 62/039,579, entitled "Gain Calibration for an Imaging System," filed Aug. 20, 2014, the entire contents of which is incorporated by reference herein. The calibration data 103 can be stored on the imaging system 100 or in data storage on another system for retrieval during image processing.

The imaging system 100 includes one or more modules configured to process image data from the focal plane array 102. One or more of the modules of the imaging system 100 can be eliminated without departing from the scope of the disclosed embodiments. The following modules are described to illustrate the breadth of functionality available to the disclosed imaging systems and not to indicate that any individual module or described functionality is required, critical, essential, or necessary.

The imaging system 100 includes the pre-processing module 104. The pre-processing module 104 can be configured to receive the digital data stream from the focal plane array 102 and to perform pre-processing functions. Examples of such functions include frame averaging, high-level frame-wide filtering, etc. The pre-processing module 104 can output serial digital data for other modules.

As an example, the pre-processing module 104 can include conditional summation functionality configured to implement integration and averaging techniques to increase apparent signal to noise in image data. For example, the conditional summation functionality can be configured to combine successive frames of digitized image data to form a digitally integrated image. This digitally integrated image can also be averaged to reduce noise in the image data. The conditional summation functionality can be configured to sum values from successive frames for each pixel from the focal plane array 102. For example, the conditional summation functionality can sum the values of each pixel from four successive frames and then average that value. In some implementations, the conditional summation functionality can be configured to select a best or preferred frame from successive frames rather than summing the successive frames. Examples of these techniques and additional embodiments are disclosed in U.S. patent application Ser. No. 14/292,124, entitled "Data Digitization and Display for an Imaging System," filed May 30, 2014, the entire contents of which is incorporated by reference herein.

As another example, the pre-processing module 104 can include adaptive resistor digital to analog converter ("RDAC") functionality configured to determine and/or adjust for operating bias points of the focal plane array 102. For example, for an imaging system that includes a shutter, the imaging system 100 can be configured to adjust an operating bias point of the detectors in the focal plane array 102. The adaptive RDAC functionality can implement an adaptive operating bias correction method that is based at least in part on intermittent measurement of a flat field image (e.g., an image acquired with the shutter closed). The adaptive RDAC functionality can implement an ongoing adjustment of the operating bias based at least in part on a measured or detected drift over time of the flat field image. The operating bias adjustment provided by the adaptive RDAC functionality may provide compensation for drift over time of the photodetectors and electronics due to effects such as temperature changes. In some embodiments, the adaptive RDAC functionality includes an RDAC network that can be adjusted to bring measured flat field data closer to a reference bias level. Additional examples of systems and methods related to the adjustments of operating biases are described in greater detail herein with reference to FIGS. 2A-8.

After the pre-processing module 104, other processing modules can be configured to perform a series of pixel-by-pixel or pixel group processing steps. For example, the image processing system 100 includes a non-uniformity correction module 106 configured to adjust pixel data for gain and offset effects that are not part of the image scene itself, but are artifacts of the sensor. For example, the non-uniformity correction module 106 can be configured to receive a stream of digital data and correct pixel values for non-uniformities in the focal plane array 102. In some imaging systems, these corrections may be derived by intermittently closing a shutter over the focal plane array 102 to acquire uniform scene data. From this acquired uniform scene data, the non-uniformity correction module 106 can be configured to determine deviations from uniformity. The non-uniformity correction module 106 can be configured to adjust pixel data based on these determined deviations. In some imaging systems, the non-uniformity correction module 106 utilizes other techniques to determine deviations from uniformity in the focal plane array. Some of these techniques can be implemented without the use of a shutter. Additional examples of systems and methods for non-uniformity correction are described in U.S. patent application Ser. No. 14/817,847, entitled "Time Based Offset Correction for Imaging Systems," filed Aug. 4, 2015, the entire contents of which is incorporated by reference herein.

After the pre-processing module 104, the imaging system 100 can include a high/low $C_{int}$ signal processing functionality configured to receive a stream of digital data (e.g., 14-bit serial data) from the pre-processing module 104. The high/low $C_{int}$ functionality can be configured to process the stream of digital data by applying gain tables, for example, as provided in the calibration data 103. The high/low $C_{int}$ functionality can be configured to process the stream of digital data using output of high/low integration components. Such high/low integration components can be integrated with the ROIC associated with the focal plane array 102. Examples of the high/low integration components are described in U.S. patent application Ser. No. 14/292,124, entitled "Data Digitization and Display for an Imaging System," filed May 30, 2014, the entire contents of which is incorporated by reference herein.

The image processing system 100 includes a filter module 108 configured to apply one or more temporal and/or spatial filters to address other image quality issues. For example, the readout integrated circuit of the focal plane array can introduce artifacts into an image, such as variations between rows and/or columns. The filter module 108 can be configured to correct for these row- or column-based artifacts, as described in greater detail in U.S. patent application Ser. No. 14/702,548, entitled "Compact Row Column Noise Filter for an Imaging System," filed May 1, 2015, the entire contents of which is incorporated by reference herein. The filter module 108 can be configured to perform corrections to reduce or eliminate effects of bad pixels in the image, enhance edges in the image data, suppress edges in the image data, adjust gradients, suppress peaks in the image data, and the like.

For example, the filter module 108 can include bad pixel functionality configured to provide a map of pixels on the focal plane array 102 that do not generate reliable data. These pixels may be ignored or discarded. In some embodiments, data from bad pixels is discarded and replaced with data derived from neighboring, adjacent, and/or near pixels. The derived data can be based on interpolation, smoothing, averaging, or the like.

As another example, the filter module 108 can include thermal gradient functionality configured to adjust pixel values based on thermal gradients present in the image data but that are not part of the scene imaged by the imaging system 100. The thermal gradient functionality can be configured to use local flat scene data to derive data to improve image quality by correcting for thermal gradients produced in the imaging system 100. Examples of determining corrections for the thermal gradient functionality are described in greater detail in U.S. Prov. App'n No. 62/086,305, entitled "Image Adjustment Based on Locally Flat Scenes," filed Dec. 2, 2014, the entire contents of which is incorporated by reference herein.

The filter module 108 can include peak limit functionality configured to adjust outlier pixel values. For example, the peak limit functionality can be configured to clamp outlier pixel values to a threshold value.

The filter module 108 can be configured to include an adaptive low-pass filter and/or a high-pass filter. In some embodiments, the imaging system 100 applies either the adaptive low-pass filter or the high-pass filter, but not both. The adaptive low-pass filter can be configured to determine locations within the pixel data where it is likely that the pixels are not part of an edge-type image component. In these locations, the adaptive low-pass filter can be configured to replace pixel data with smoothed pixel data (e.g., replacing pixel values with the average or median of neighbor pixels). This can effectively reduce noise in such locations in the image. The high-pass filter can be configured to enhance edges by producing an edge enhancement factor that may be used to selectively boost or diminish pixel data for the purpose of edge enhancement. Additional examples of adaptive low-pass filters and high-pass filters are described in U.S. patent application Ser. No. 14/817,989, entitled "Local Contrast Adjustment for Digital Images," filed Aug. 4, 2015, the entire contents of which is incorporated by reference herein.

The filter module 108 can be configured to apply optional filters to the image data. For example, optional filters can include, without limitation, averaging filters, median filters, smoothing filters, and the like. The optional filters can be turned on or off to provide targeted or desired effects on the image data.

The image processing system 100 includes a thermography module 110 configured to convert intensity to temperature. The light intensity can correspond to intensity of light from a scene and/or from objects in a field of view of the imaging system 100. The thermography module 110 can be configured to convert the measured light intensities to temperatures corresponding to the scene and/or objects in the field of view of the imaging system 100. The thermography module 110 can receive as input calibration data (e.g., calibration data 103). The thermography module 110 may also use as inputs raw image data (e.g., pixel data from the pre-processing module 104) and/or filtered data (e.g., pixel data from the filter module 108). Examples of thermography modules and methods are provided in U.S. Prov. App'n No. 62/043,005, entitled "Image Display and Thermography for a Thermal Imaging Camera," filed Aug. 28, 2014, the entire contents of which is incorporated by reference herein.

The image processing system 100 includes a histogram equalization module 112, or other display conversion module, configured to prepare the image data for display on the display 116. In some imaging systems, the digital resolution of the pixel values from the focal plane array 102 can exceed the digital resolution of the display 116. The histogram equalization module 112 can be configured to adjust pixel values to match the high resolution value of an image or a portion of an image to the lower resolution of the display 116. The histogram module 112 can be configured to adjust pixel values of the image in a manner that avoids using the limited display range of the display 116 on portions of the image where there is little or no data. This may be advantageous for a user of the imaging system 100 when viewing images acquired with the imaging system 100 on the display 116 because it can reduce the amount of display range that is not utilized. For example, the display 116 may have a digital brightness scale, which for an infrared image corresponds to temperature where higher intensity indicates a higher temperature. However, the display brightness scale, for example a grey scale, is generally a much shorter digital word than the pixel sample words. For instance, the sample word of the pixel data may be 14 bits while a display range, such as grey scale, can be typically 8 bits. So for display purposes, the histogram equalization module 112 can be configured to compress the higher resolution image data to fit the display range of the display 116. Examples of algorithms and methods that may be implemented by the histogram equalization module 112 are disclosed in U.S. patent application Ser. No. 14/292,124, entitled "Data Digitization and Display for an Imaging System," filed May 30, 2014, the entire contents of which is incorporated by reference herein.

The imaging system 100 includes a display processing module 114 configured to prepare the pixel data for display on the display 116 by, for example, selecting color tables to convert temperatures and/or pixel values to color on a color display. As an example, the display processing module can include a colorizer lookup table configured to convert pixel data and/or temperature data into color images for display on the display 116. The colorizer lookup table can be configured to display different temperatures of a thermally imaged scene using different color display lookup tables depending at least in part on the relationship of a temperature of a given scene to a threshold temperature. For example, when a thermal image of a scene is displayed, various temperatures of the scene may be displayed using different lookup tables depending on their relationship to the input temperature. In some embodiments, temperatures above, below, or equal to an input temperature value may be displayed using a color lookup table, while other temperatures may be displayed using a grey scale lookup table. Accordingly, the colorizer lookup table can be configured to apply different colorizing lookup tables depending on temperature ranges within a scene in combination with user preferences or selections. Additional examples of functionality provided by a display processing module are described in U.S. Prov. App'n No. 62/049,880, entitled "Selective Color Display of a Thermal Image," filed Sep. 12, 2014, the entire contents of which is incorporated herein by reference in its entirety.

The display 116 can be configured display the processed image data. The display 116 can also be configured to accept input to interact with the image data and/or to control the imaging system 100. For example, the display 116 can be a touchscreen display.

The imaging system 100 can be provided as a standalone device, such as a thermal sensor. For example, the imaging system 100 can include an imaging system housing configured to enclose hardware components (e.g., the focal plane array 102, read out electronics, microprocessors, data storage, field programmable gate arrays and other electronic components, and the like) of the imaging system 100. The imaging system housing can be configured to support optics configured to direct light (e.g., infrared light, visible light, etc.) onto the image sensor 102. The housing can include one or more connectors to provide data connections from the imaging system 100 to one or more external systems. The housing can include one or more user interface components to allow the user to interact with and/or control the imaging system 100. The user interface components can include, for example and without limitation, touch screens, buttons, toggles, switches, keyboards, and the like.

In some embodiments, the imaging system 100 can be part of a network of a plurality of imaging systems. In such embodiments, the imaging systems can be networked together to one or more controllers.

Figure 1B:
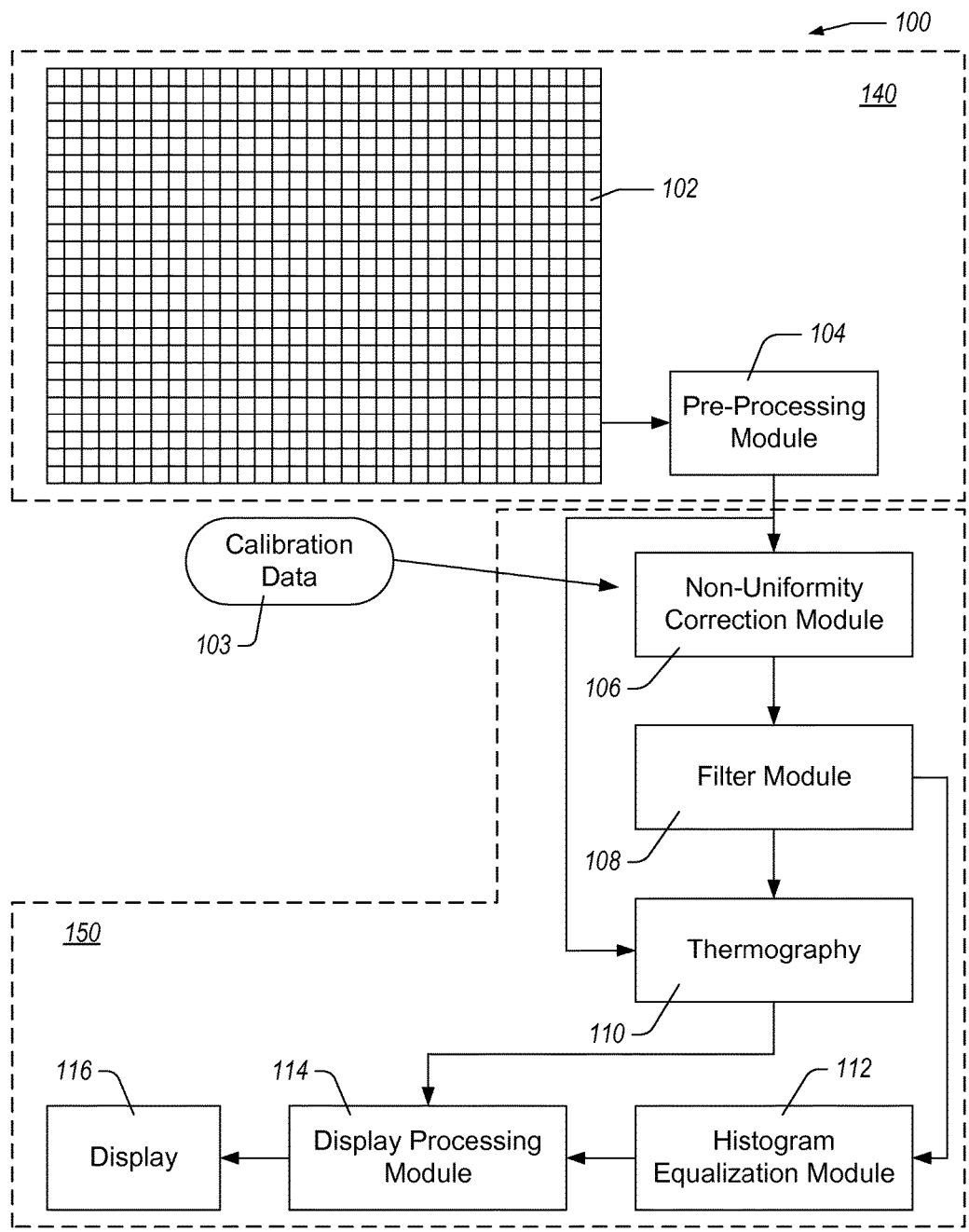
FIG. 1B illustrates a functional block diagram of the example imaging system illustrated in FIG. 1A, wherein functionality of the imaging system is divided between a camera and a mobile electronic device.

FIG. 1B illustrates a functional block diagram of the example imaging system 100 illustrated in FIG. 1A, wherein functionality of the imaging system 100 is divided between a camera or sensor 140 and a mobile electronic device 150. By dividing image acquisition, pre-processing, signal processing, and display functions among different systems or devices, the camera 140 can be configured to be relatively low-power, relatively compact, and relatively computationally efficient compared to an imaging system that performs a majority or all of such functions on board. As illustrated in FIG. 1B, the camera 140 is configured to include the focal plane array 102 and the pre-processing module 104. In some embodiments, one or more of the modules illustrated as being part of the mobile electronic device 150 can be included in the camera 140 instead of in the mobile electronic device 150. In some embodiments, certain advantages are realized based at least in part on the division of functions between the camera 140 and the mobile electronic device 150. For example, some pre-processing functions can be implemented efficiently on the camera 140 using a combination of specialized hardware (e.g., field-programmable gate arrays, application-specific integrated circuits, etc.) and software that may otherwise be more computationally expensive or labor intensive to implement on the mobile electronic device 150. Accordingly, an aspect of at least some of the embodiments disclosed herein includes the realization that certain advantages may be achieved by selecting which functions are to be performed on the camera 140 (e.g., in the pre-processing module 104) and which functions are to be performed on the mobile electronic device 150 (e.g., in the thermography module 110).

An output of the camera 140 can be a stream of digital data representing pixel values provided by the pre-processing module 104. The data can be transmitted to the mobile electronic device 150 using electronic connectors (e.g., a micro-USB connector, proprietary connector, etc.), cables (e.g., USB cables, Ethernet cables, coaxial cables, etc.), and/or wirelessly (e.g., using BLUETOOTH, Near-Field Communication, Wi-Fi, etc.). The mobile electronic device 150 can be a smartphone, tablet, laptop, or other similar portable electronic device. In some embodiments, power is delivered to the camera 140 from the mobile electronic device 150 through the electrical connectors and/or cables.

The imaging system 100 can be configured to leverage the computing power, data storage, and/or battery power of the mobile electronic device 150 to provide image processing capabilities, power, image storage, and the like for the camera 140. By off-loading these functions from the camera 140 to the mobile electronic device 150, the camera can have a cost-effective design. For example, the camera 140 can be configured to consume relatively little electronic power (e.g., reducing costs associated with providing power), relatively little computational power (e.g., reducing costs associated with providing powerful processors), and/or relatively little data storage (e.g., reducing costs associated with providing digital storage on the camera 140). This can reduce costs associated with manufacturing the camera 140 due at least in part to the camera 140 being configured to provide relatively little computational power, data storage, and/or power, because the imaging system 100 leverages the superior capabilities of the mobile electronic device 150 to perform image processing, data storage, and the like.

Example Imaging System Configured to Acquire Flat Field Images

Figure 2A:
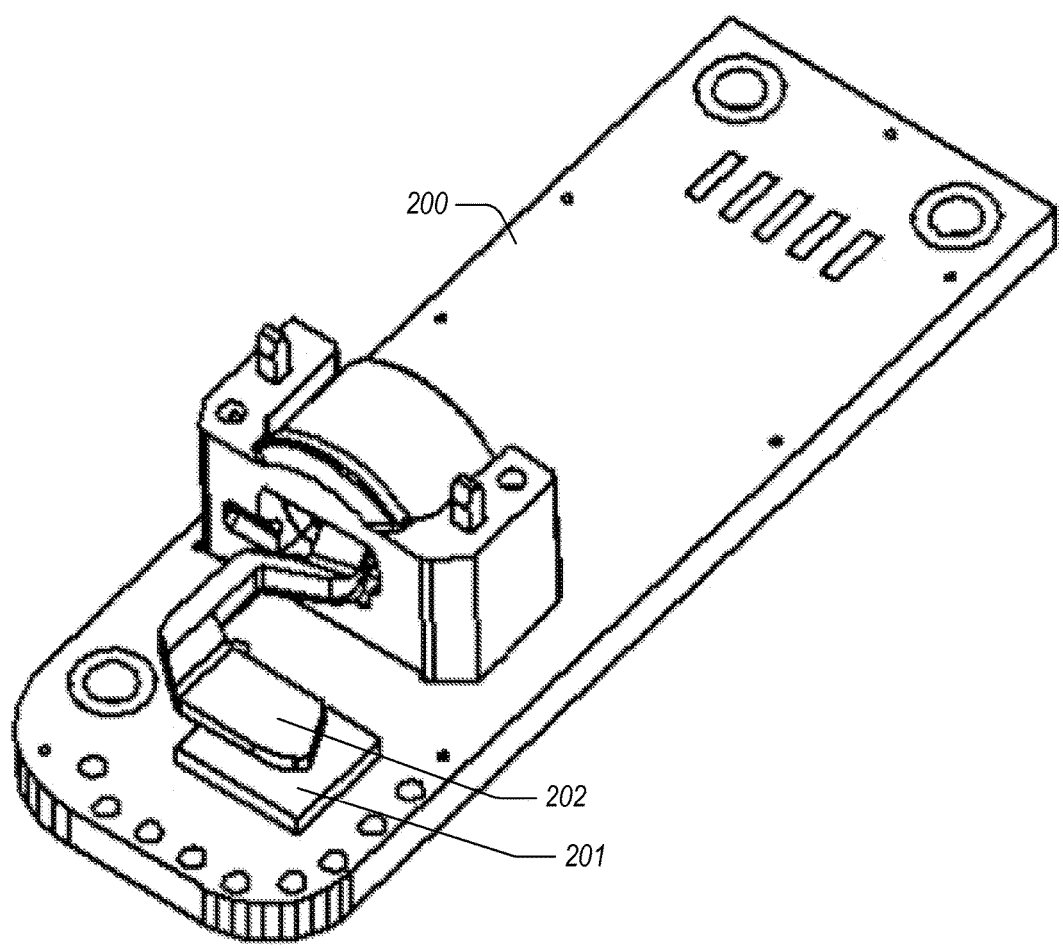
FIGS. 2A and 2B illustrate an example embodiment of an infrared camera core.
Figure 2B:
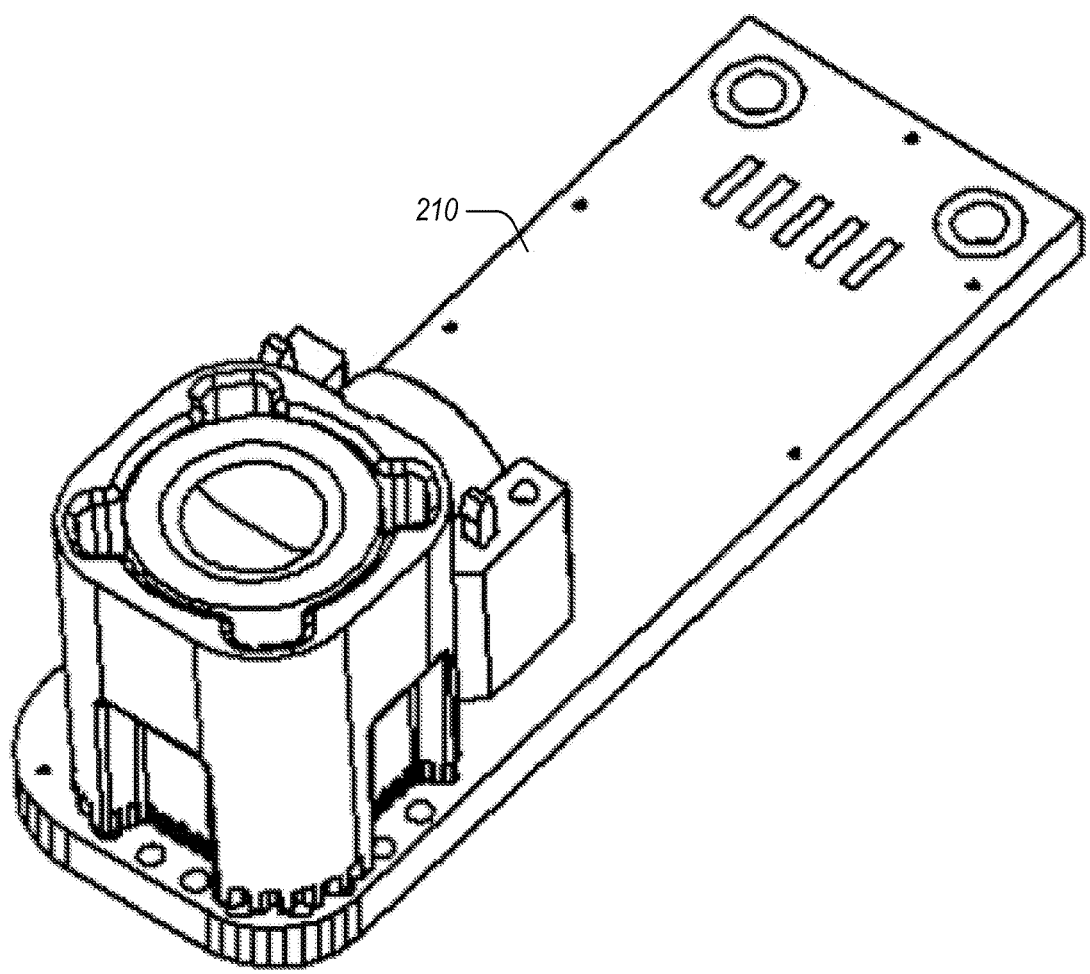

FIGS. 2A and 2B illustrate an exemplary camera core, the camera core 200 being partially assembled (as illustrated in FIG. 2A) and the camera core 210 being a fully assembled core. A focal plane array (FPA) 201 is positioned on the core 200 relative to shutter 202, such that the shutter 202 can be actuated to expose and to occlude the FPA 201. Various interface electronics may be part of the camera core 200 or part of a controller mated to the core 200.

Figure 3B:
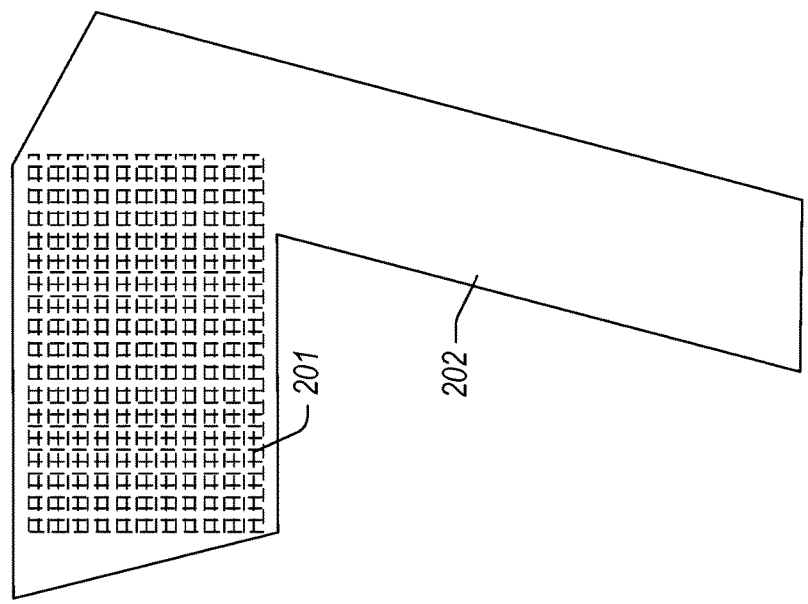
FIGS. 3A and 3B illustrate exemplary general operation of a shutter in an imaging system.
Figure 3A:
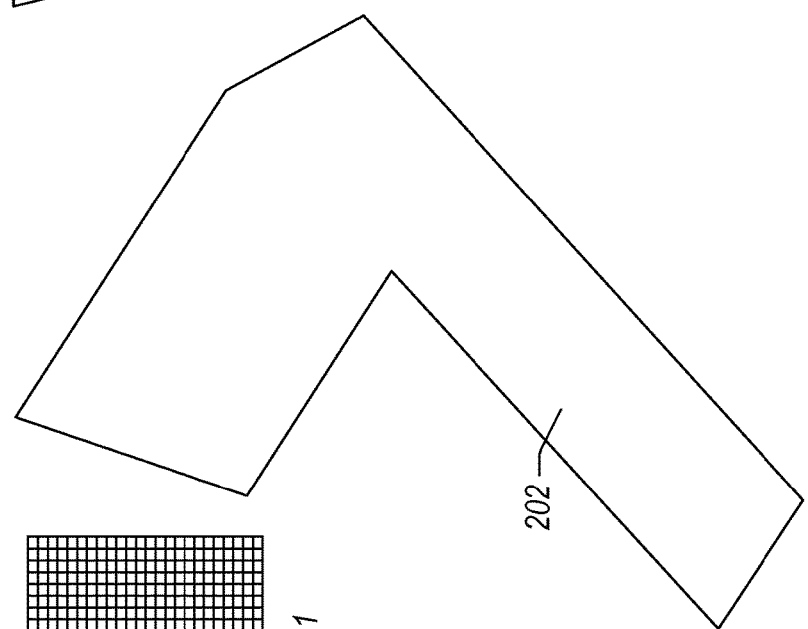
Figure 3A:
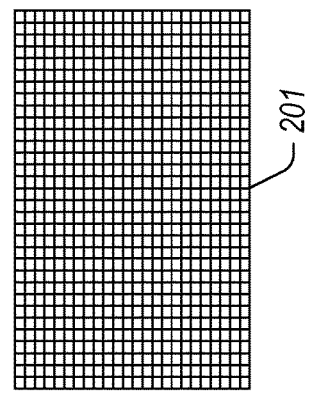

FIGS. 3A and 3B illustrate an example shutter 202 and an example FPA 201, with the shutter 202 exposing the FPA 201 (illustrated in FIG. 3A) and occluding the FPA 201 (illustrated in FIG. 3B). When the shutter 202 occludes the FPA 201, the shutter 202 can be said to be closed. In the closed position, the shutter 202 can be configured to cover the entire field of view of the FPA 201, Arrangements for selectively exposing the FPA 201 to a flat field scene are possible other than moving a shutter flag. For instance, a mirror may be rotated to expose the FPA 201 to a flat scene. As another example, an electro-optical cell that can be alternated between opaque and transparent states to selectively expose and occlude the FPA 201. As used herein, opening a shutter and closing a shutter should be respectively understood to include exposing the FPA 201 to an image scene and exposing the FPA 201 to a flat field scene. In the closed position, image data can be acquired by the FPA 201. This acquired image data with the shutter 202 closed can be equivalent or similar to a flat field image of a dark field of view for a visible light imaging system or a cooled infrared imaging system. For an uncooled IR imager, images acquired with the shutter 202 closed may be equivalent to a flat field image at a temperature of the shutter 202.

Flat field scenes and images can be used to determine compensation factors for drifts in operating biases or reference bias levels, different gains and/or dark currents for pixels in an imaging system, and/or to correct for non-uniformities in the imaging system. In general, a flat field scene can generally refer to a substantially uniform scene provided for an imaging sensor. Flat field scenes can be used to determine targeted reference bias levels for photodetectors in an imaging array. Similarly, a flat field image can generally refer to image data of a flat field scene. A dark flat field scene or dark flat field image, or similarly a flat field image of a dark scene or field of view, can generally refer to a flat field scene that is substantially free of light. A flat field of a dark field of view can be used in a visible light imaging system and/or a cooled infrared imaging system to determine dark currents in pixels in an imaging array (e.g., currents or signals in pixels with no light incident on the pixels). For an uncooled infrared imager, the shutter 202 may radiate infrared light with an intensity corresponding to a temperature of the shutter 202. Thus, with the shutter 202 closed for an uncooled infrared imager, images acquired with the shutter 202 closed are generally not flat field images of a dark field of view, but are flat field images with incident light intensity corresponding to a temperature of the shutter 202. A flat field image can be used to determine reference bias levels and/or non-uniformities by determining photodetector values in the flat field image data and/or pixel-to-pixel variations. Ideally, the pixels in a flat field image should have approximately the same values. Similarly, a flat field image of a dark field of view can be used to determine pixel dark currents because ideally pixel intensity values should be substantially equal to 0 where there is no incident radiation. Adjustments can be made to operating biases of photodetectors to bring measured flat field data closer to a reference bias level. In certain implementations, the reference bias level can be the same for all photodetectors in the imaging system. As a result, the photodetectors with adjusted operating biases can acquire image data with the shutter open, the resulting image data being inherently compensated for differences between photodetectors and/or corrected for drifting reference bias levels.

As described herein, non-image signals can contribute significantly to signals read out from pixels in some imaging arrays. These non-image signals can be correlated to a temperature of the imaging array. For uncooled infrared imagers, in certain implementations, images acquired with the shutter 202 in the closed position can be approximated as flat field images with an intensity corresponding to the temperature of the shutter 202. The correction factors, such as pixel offset values, determined using these flat field images thus incorporate the temperature of the imaging array due at least in part to the temperature of the shutter 202 behaving similarly to the temperature of the FPA 201. For example, changes in the temperature of the shutter 202 track changes in the temperature of the FPA 201. Thus, using flat field images with the shutter 202 closed in uncooled infrared imagers allows for adjustments to be determined that are affected by temperature in a way that is similar to images of scenes (e.g., images acquired with the shutter 202 open).

To determine operating bias adjustments, a frame (or multiple frames) of image data may be acquired with the shutter 202 closed. The acquired image data from each pixel may be used by a system controller to adjust operating biases to improve the quality of frames of image data acquired with the shutter 202 open. The acquired image data with the shutter 202 closed can provide information used to correct or compensate for drift and offset effects in the imaging array on a pixel-by-pixel basis. Typically, shutter-based data correction is used in infrared imagers where the signals dependent on detected radiation are often small compared to bias voltages, pixel signal drifts, and/or pixel-to-pixel non-uniformities. The systems and methods disclosed herein may also be beneficial to imaging systems sensitive to light in the visible portion of the spectrum, such as those imaging systems used in photometry or low-light applications.

Examples of Adjusting Operating Biases

Figures 4A, 4B:
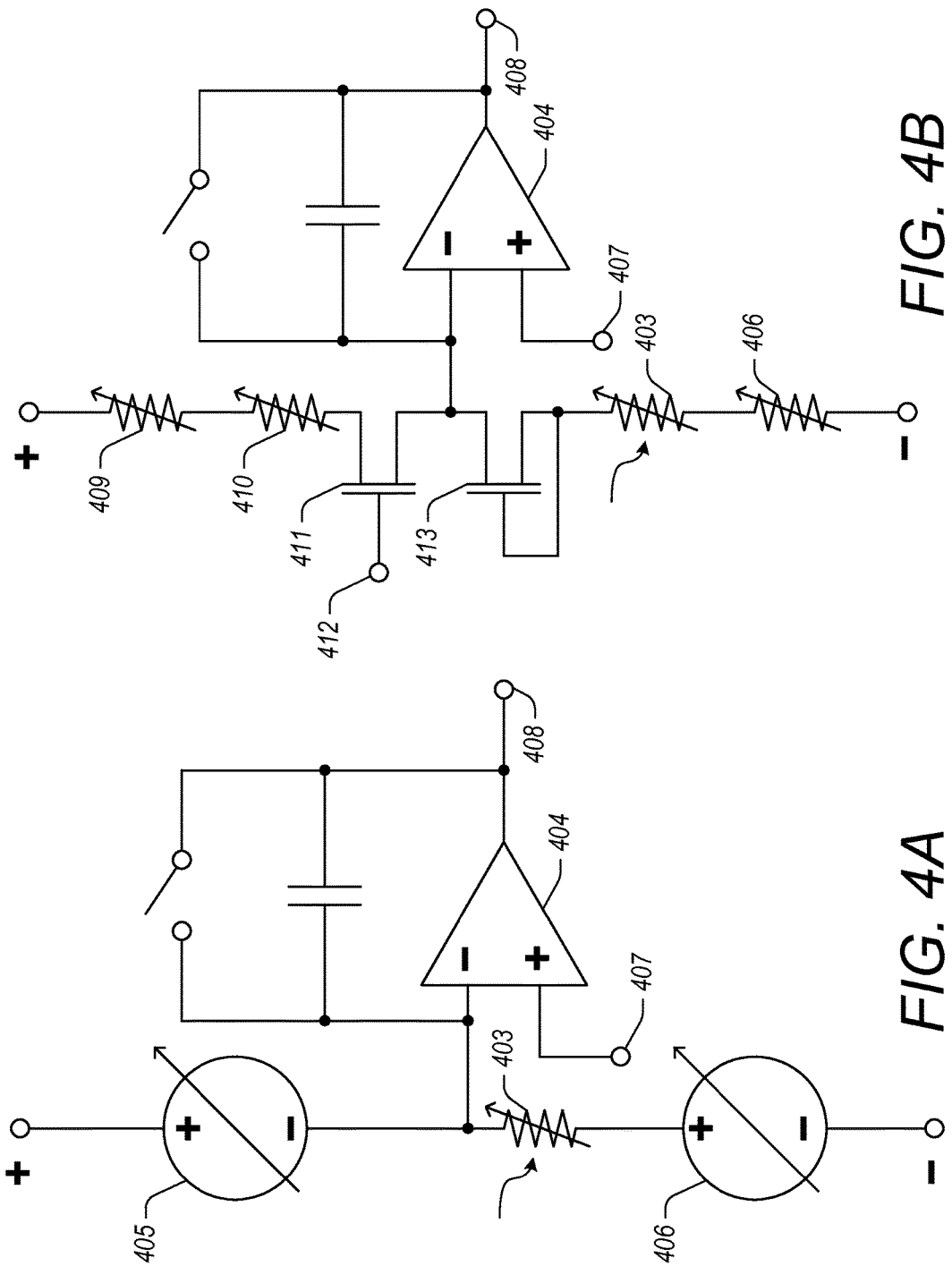
FIGS. 4A-4C illustrate electrical schematic diagrams of example circuits for photodetectors in an imaging system.
Figure 4C:
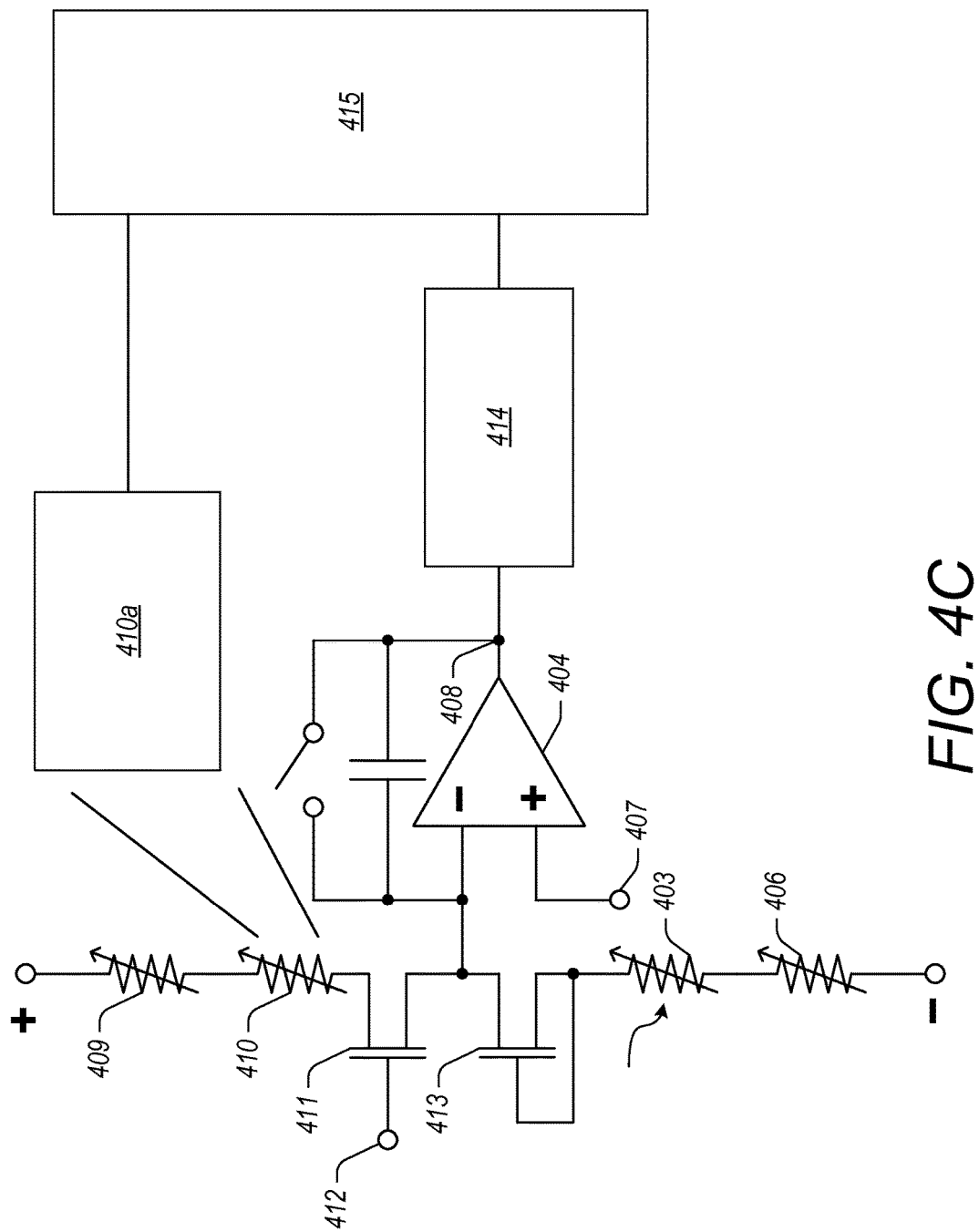

FIGS. 4A-4C illustrate electrical schematic diagrams of example circuits for photodetectors in an imaging system. As illustrated, the schematic diagrams are limited to a portion of the circuitry for a photodetector (e.g., a pixel) of an example FPA with microbolometers. The schematic diagrams are also limited in that the circuitry includes elements related to setting operating biases and control while other circuitry that may be present in the imaging system is not shown or discussed. It should be noted that other detector types and other implementations using microbolometers may use other circuit designs. The disclosed systems and methods, however, may be implemented on many types of FPAs used for a variety of imaging applications.

With reference to FIG. 4A, the circuit includes a photodetector 403 (e.g., a microbolometer) electrically coupled to voltage rails providing voltage to the imaging array. The circuit includes adjustable voltage setting elements 405, 406 that can be configured to be uniquely set for each photodetector 403 to establish an operating bias of the photodetector 403. Such an arrangement may be beneficial for a number of reasons. For example, photodetector responsivity to radiation, signal to noise, and the like may depend on the voltage across the photodetector, and may vary from photodetector to photodetector across an imaging array as well as from imaging array to imaging array. Thus, it may be advantageous to be able to adjust operating biases of photodetectors globally and locally.

As another example, depending at least in part on characteristics of the rest of the electronics in the imaging system, fine tuning of pixel-by-pixel operating ranges may be advantageous. For example, operating biases can be configured for individual photodetectors so that each photodetector outputs a similar signal in response to a flat field scene. As illustrated in the schematic diagrams of FIGS. 4A-4C, the signal output from the photodetector 403 can be affected by circuit elements to convert a changing resistance of a bolometer, for example, to an output voltage and/or output digital value (e.g., after an analog-to-digital conversion). Adjusting the operating bias of such a photodetector can include adjusting voltages and/or resistances of electrical components so that the signal output for a flat field image is within a targeted range of a reference bias level. Advantageously, this can adjust photodetector responses so that the operating ranges for all photodetectors are similar. For example, where the photodetector 403 is coupled to a n-bit analog-to-digital ("ADC") converter (e.g., a 14-bit ADC has 16,384 counts), setting the reference bias level to be a targeted number of ADC counts, $R_B$, (e.g., about 3000 counts) can mean that photodetectors in the imaging system have about $2^n - R_B$ counts available for signals greater than the flat field signal and about $R_B$ counts available for signals less than the flat field signal.

In operation, adjusting operating biases can advantageously reduce the chances that photodetectors will have runaway responses. For example, characteristics of a photodetector may change over time such that the response of the photodetector to a similar input level of radiation will increase over time. If unchecked, this can reduce the operating range of the photodetector. Thus, adjusting an operating bias of the photodetector can compensate for this behavior so that an operating range of the photodetector remains within a targeted zone. Similarly, adjusting the operating bias of photodetectors can provide a way of increasing uniformity of photodetector behavior across the imaging array and/or across a plurality of imaging arrays. This can advantageously provide a way to have similar operating characteristics across multiple imaging systems. In this way, cameras used in different settings by different users can behave similarly to one another.

With reference to FIG. 4A, the photodetector 403 is connected to an integrator 404, whose output 408 is a signal representing the intensity of radiation intensity incident on photodetector 403. The integrator 404 may be biased itself by integrator bias voltage 407, $V_{int}$. The integrator bias voltage may be particularly useful for an imaging system utilizing an uncooled IR FPA because a flat field image (e.g., an image with the shutter closed) does not correspond to a dark flat field image (e.g., it is not a zero radiation signal) as it may be for an imaging system configured to detect visible light. For instance, the shutter may be at the temperature of the imaging system, and subsequent images acquired of a scene may include regions that are both colder than the shutter and hotter than the shutter. Thus, the integrator bias voltage for flat field data may advantageously be set to a value that is not zero. For example, the integrator bias voltage 407 can be configured so that when the photodetector 403 is exposed to a flat field image, the output signal 408 of the integrator 404 can be within a targeted reference bias output. In some embodiments, this reference bias output can be a targeted reference bias voltage. In some embodiments, this reference bias output can be a number of ADC counts.

FIG. 4B illustrates an electrical schematic diagram of another example circuit for photodetectors in an imaging system. In this embodiment, the electrical schematic includes a network of resistors configured to provide a tailored operating bias to individual photodetectors in the imaging array. The circuit includes a global biasing element 409 (e.g., a variable resistor such as a resistor network) that may be globally set for all photodetectors in the imaging array. The global biasing element 409 can be used as an overall coarse adjustment of operating biases for the imaging array. The circuit includes a focused biasing element 406 (e.g., a variable resistor such as a resistor network) that may be coupled to photodetectors in a column or row of the imaging array. The focused biasing element 406 can be used as a more focused adjustment of operating biases for photodetectors in the associated column or row. The circuit includes a fine biasing element 410 (e.g., a variable resistor such as a resistor network) that may be associated with the particular photodetector 403. The fine biasing element 410 can be used as a fine adjustment of the operating bias for the individual photodetector 403. Thus, the biasing elements 406, 409, and 410 can be used in combination to set tailored operating biases for each photodetector in the imaging array. In some embodiments, the global biasing element 409 and the focused biasing element 406 can be set during an initial calibration to generally bias the output of the photodetectors in the imaging array to be close to a reference bias output. Thereafter, the fine biasing element 410 can be adjusted on a per-pixel basis to adjust the output of individual photodetectors 403 to be within a targeted range of the reference bias output when exposed to a flat field scene.

The circuit includes transistors 411 and 413 that may be used as elements to control currents in the imaging array. Input 412 can be a location configured to receive a signal from other related circuits, such as a mirror circuit configured to provide a reference signal to the photodetector circuit. Not shown are various switches that may be used to selectively couple photodetectors to the electrical system of the imaging system, such as when each photodetector is interrogated. For instance, the photodetector 403, the fine biasing element 410 and transistor 411 may be configured to be associated with an individual pixel of the imaging array while other elements such as the other biasing elements 406, 409 and the integrator 404 may be configured to be associated with a particular column or row, these elements being switched to couple to an individual photodetector 403 as that particular photodetector is read out.

FIG. 4C illustrates additional components for the electrical schematic diagram of FIG. 4B. The output signal 408 is delivered to an analog-to-digital converter 414 to convert the pixel data to digital data. The digital data can be delivered to a processing element 415, such as a system controller. Fine control of the operating bias for the individual photodetector 403 can be provided by a fine control element 410a. The fine control element 410a can be controlled by the processing element 415. The elements controlling the operating biases (e.g., biasing elements 406, 409, 410 and/or fine control element 410a) may be implemented in various configurations. For example, biasing elements 406, 409 and 410 may be implemented as resistor networks that can be configured under control of the processing element 415. In certain implementations, one or more of the biasing elements 406, 409, 410 can be controlled digitally through the use of digital words sent from the processing element 415 to the particular biasing element.

As a particular example, for illustration purposes, the fine control element 410a, which can be a resistor digital-to-analog converter ("RDAC") in certain implementations, may be configured as a 7-bit resistor network, with the least significant bit ("LSB") equivalent to about 1 kΩ, thus allowing the RDAC to be set to values between about 1 kΩ and about 128 kΩ in increments of about 1 kΩ. Focused biasing element 406 may be a 4-bit resistor network with the LSB equivalent to about 4 kΩ. Global biasing element 409 may be configured to be selected from a few values, such as about 25 kΩ, about 50 kΩ, and about 75 kΩ. The biasing elements can be adjusted through switches, for example, under control of the processing element 415. Thus, in this illustrative embodiment, the overall bias network has a resistance in the range of tens of kilo-ohms, with a fine adjustment of the resistance for individual photodetectors in increments of about 1 kΩ. In some implementations of imaging arrays with microbolometers, the photodetectors may have resistances on the order of tens of kilo-ohms at room temperature. In such a configuration, the total resistance of the photodetector circuit can be on the order of about 100 kΩ. With a fine adjustment control of about 1 kΩ, the operating bias voltage across the photodetector 403 may be controlled with a resolution of about 1%, thereby providing for effective control of operating biases for each photodetector in the imaging array.

Example Calibration Processes

Variations in the fabrication processes of photodetectors may cause performance variations from pixel to pixel (e.g., variations in output signals from individual photodetectors with similar incident radiation). Variations in electrical components in the readout electronics may also contribute to performance variations. For many photodetectors, including microbolometers, such variations in responsivity may be reduced by configuring the operating bias (e.g., an operating voltage bias point) of each detector individually. Advantageously, the bias adjustment systems and methods disclosed herein may be used to reduce variations caused by differences in photodetectors as well as by variations in electrical circuits by determining appropriate or targeted operating biases for individual photodetectors and configuring adjustable biasing elements to achieve the determined operating biases. These disclosed systems and methods may also advantageously be used in conjunction with a calibration procedure performed at some point before the imaging array is used for imaging to make the responsivity more uniform across the imaging array. The calibration procedure is described with reference to FIGS. 5A and 5B, which illustrate example results of a calibration process.

In the calibration process, a series of steps may be performed to adjust biasing elements to achieve tailored operating biases configured to compensate for pixel-to-pixel variations in the various circuit elements. For example, configurations of various elements of the circuitry may be tailored to achieve substantially uniform operation with the imaging detector inactive, such as shorting the detector for these calibration steps. For example, the global biasing element 409 and the focused biasing element 406 can be set so that the photodetector output is close to a targeted value when the photodetector is shorted. In certain implementations, various elements of the circuit other than the RDACs may be adjusted with the detectors inactive.

At this point a calibration process that includes setting the pixel-by-pixel portions of the biasing elements (e.g., resistor networks, RDACs, etc.) may be performed. The detectors may be switched to active and a flat field scene may be imaged. The scene may be of the shutter in the closed position, or alternatively the scene can be a controlled temperature scene of a type typically used in infrared test systems (e.g., an extended controllable blackbody source). For the case of an uncooled FPA viewing the shutter, the uniform scene is at room temperature, or for a test setup calibration, the scene may be at a predetermined or tailored temperature around a midpoint of the desired operating temperature range of the imaging system. Since subsequent actual imaged scenes may include areas both hotter and colder than room temperature, it may be beneficial to set the calibration temperature baseline response (e.g. pixel value) somewhere in the middle of the circuit range and/or the analog-to-digital converter range. For example, for the illustrative circuit of FIG. 4C, a convenient midpoint may be the integrator bias voltage 407.

By way of example, a particular embodiment can have an integrator bias voltage 407, $V_{int}$, of about 1.2 V and the analog-to-digital converter 414 can have a range of 14 bits (or 16384 counts). For such a configuration, the output 408 of the integrator 404 when the photodetector 403 is exposed to a flat field scene at room temperature can be configured to be substantially equal to a targeted reference bias voltage, $V_{ref}$, corresponding to about 3000 counts of the analog-to-digital converter 414. The fine biasing element 410 can be adjusted until the output 408 produces the targeted result. This corresponds to adjusting the operating bias of the photodetector 403. Setting the targeted output to be less than half of the available ADC range may be advantageous because typically more dynamic range is desired on the hot side of room temperature than the cool side for subsequent scene imaging.

Figure 5A:
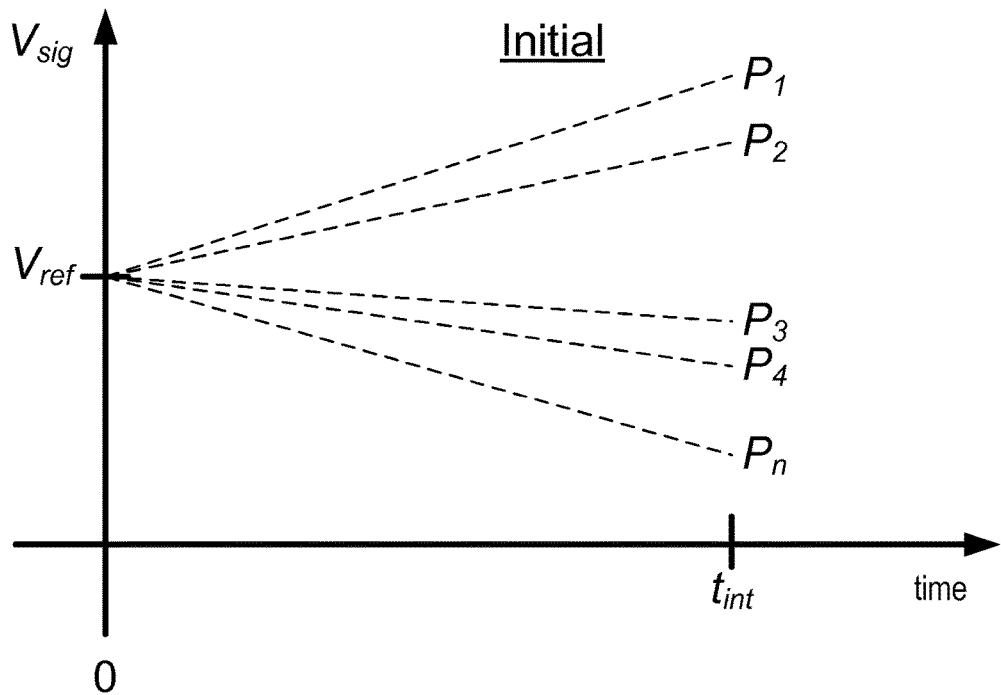
FIGS. 5A and 5B illustrate example results of a calibration process configured to adjust operating biases of photodetectors in an imaging system.
Figure 5B:
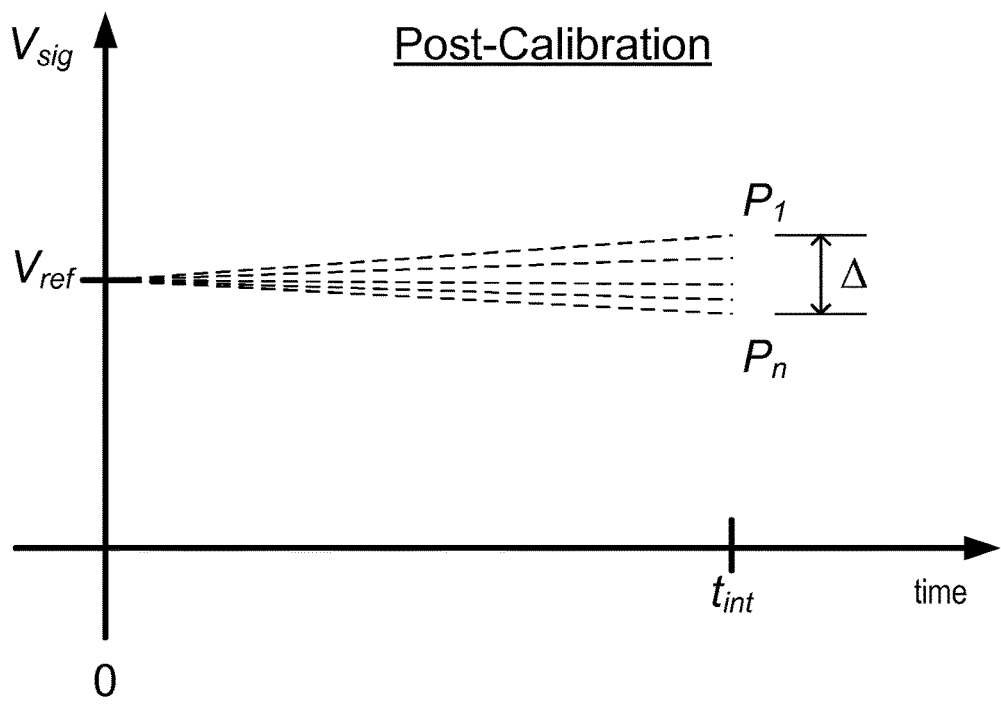

With reference to FIG. 5B, adjusting the biasing elements based on the flat field response across the imaging array may be used to reduce the signal output of individual photodetectors or pixels to be within a range $\Delta$ of the reference bias voltage, $V_{ref}$. This may be accomplished by adjusting each biasing element until each pixel is within the range $\Delta$. In certain implementations, adjustments can be made to the biasing elements to reduce pixel-to-pixel variations to be within the range $\Delta$, wherein the range $\Delta$ can be greater than or equal to the variation equivalent to the finest adjustment available in the system. For example, the finest adjustment available to the system can correspond to a least significant bit ("LSB") in an RDAC. In the illustrative example described herein, that can correspond to the signal variation due to the bias shift caused by a 1 k$\Omega$ change of the RDAC value.

Example Adaptive Adjustment Processes

The calibration of the imaging system as a whole may be done during initial setup and test, or at any time for a system with a shutter and digital control of the biasing elements, such as the implementations described herein with reference to FIG. 4C. The calibration process described herein with reference to FIGS. 5A and 5B may reduce initial variations in the imaging array, but for some imaging array types, such as FPAS with microbolometers, response may drift over time and with changes in ambient temperature. Furthermore, the associated response drift may also be non-uniform across the array. The drift characteristics may, in some cases, not be substantial enough to warrant a complete re-calibration of the imaging system but may be substantial enough to adversely affect image quality.

Figure 6:
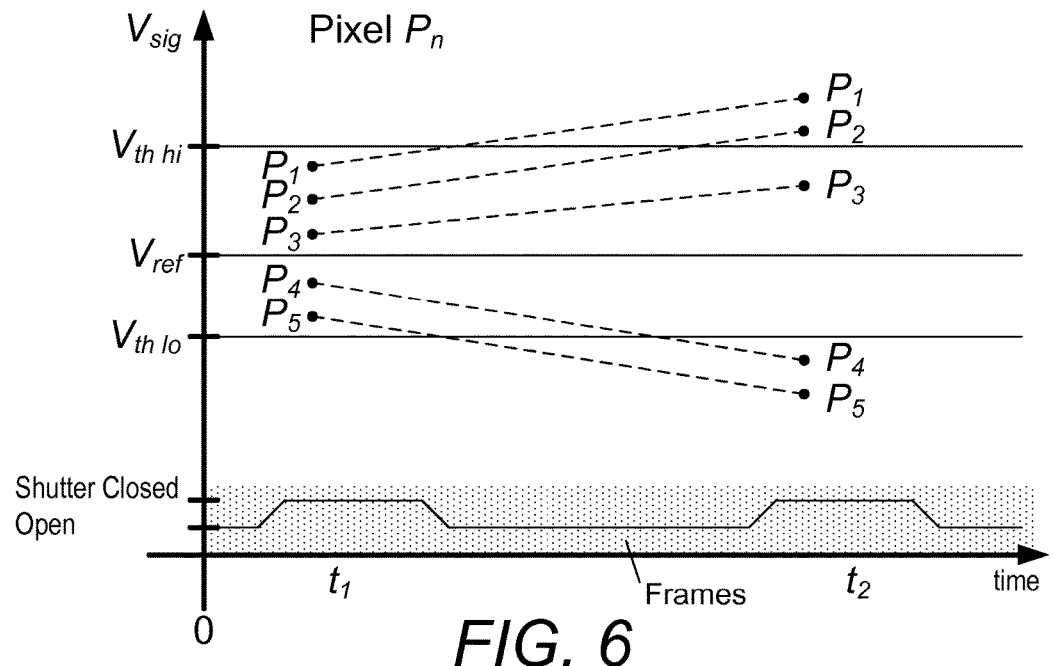
FIG. 6 illustrates an example of pixel values for a flat field image drifting over time.

Thus, an ongoing adaptive re-adjustment of the pixel-by-pixel operating bias during operation of the imaging system may be beneficial. With reference to FIG. 6, at a first time, $t_1$, the shutter may be closed for a number of image frames (e.g., a plurality of flat field images may be acquired). Pixels $P_n$ may be initially close to the reference bias voltage, $V_{ref}$, for example, due at least in part to an initial calibration process. Thresholds $V_{th\ hi}$ and $V_{th\ lo}$ may be set such that when the flat field response of an individual pixel is within the thresholds, the image quality is acceptable during imaging with the shutter open. At a later time, $t_2$, the shutter may be closed again and a number of frames of the flat field scene can be acquired. Due at least in part to temperature changes in the external environment and within the imaging system and possibly to other time-based effects, the flat field response of some pixels may change enough to be outside of the thresholds.

Figure 7:
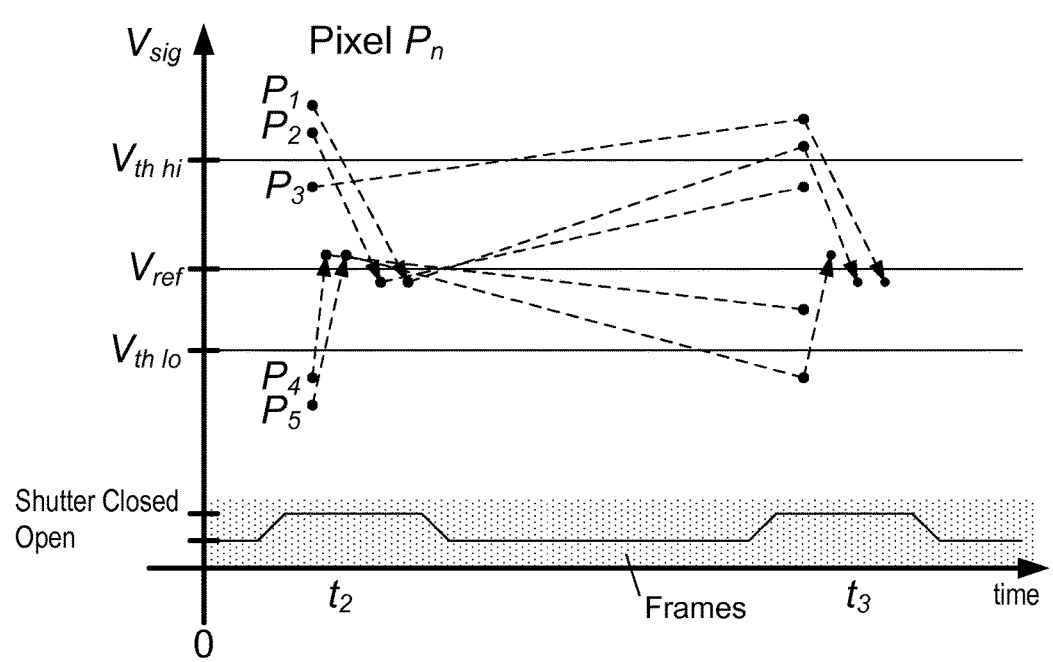
FIG. 7 illustrates an example of adjusting operating biases to compensate for drifting pixel values over time.

FIG. 7 illustrates an example of adjusting operating biases to compensate for drifting pixel values over time. As shown, during the shutter closed period, $t_2$, the biasing elements may be adjusted to bring the pixel responses back within the thresholds. With reference to the example embodiments described herein with reference to FIGS. 4A-4C, it may be adequate to adjust the fine biasing element 410 (e.g., the fine control element 410a, the RDAC, etc.) to accomplish a suitable adjustment of the operating bias rather than repeating the calibration process for additional adjustable parameters of the detector circuit. Thus, in certain implementations, the fine biasing element 410 (e.g., the RDAC) may be the only element adjusted to adjust the operating bias for individual pixels. This can allow re-adjustment of the operating bias to be accomplished quickly, with little or no effect on the imaging system, such as missing image frames. This process can be performed intermittently during use of the imaging system. For example, operating biases can be adjusted during a later time, $t_3$. In some embodiments, the operating bias is adjusted multiple times during a shutter closed period, adjustments being made until the signal output for the photodetector is within the targeted range (e.g., between $V_{th\ lo}$ and $V_{th\ hi}$).

In certain implementations, the operating bias can be adjusted to make the photodetector response move to the opposite side of the midpoint of the targeted range relative to the direction of the drift. This can advantageously be done to compensate at least partially for the trend of the drift. For example, as illustrated in FIG. 7, pixel $P_3$ can be adjusted to be less than the reference bias voltage, $V_{ref}$, during time $t_3$ to compensate for the drift that caused it to exceed $V_{th,hi}$. The over-compensation may be small for some cases, for example ½ LSB of the RDAC above or below the midpoint. Since the RDAC is adjusted by a minimum of one LSB, the overcompensation range around the threshold can correspond to be about ±½ LSB of the RDAC. The threshold range can be configured to exceed the size of the change in output signal corresponding to a change of one LSB in the RDAC.

If the re-adjustment of the operating bias can be accomplished with the RDAC alone then the process may be quick. For instance, it has been observed for an exemplary camera core that once the camera has thermally stabilized, drift slows down and closing the shutter and re-adjusting may be accomplished once every few seconds or even minutes to achieve acceptable or suitable results. The process of checking thresholds and changing RDAC values may be accomplished using a few image frames worth of time during shutter closed times, which for cameras operating in the 5 to 60 Hz frame rate range, may mean as little as a fraction of a second every few minutes to perform the adaptive and dynamic bias adjustments disclosed herein.

In some embodiments multiple frames may be acquired and averaged together to produce single data frames to reduce noise. This may be a conditional sum/average such as described in U.S. patent application Ser. No. 14/292,124, entitled "Data Digitization and Display for an Imaging System," filed May 30, 2014, the entire contents of which is incorporated by reference herein. In some embodiments, further signal processing may be done on the image data, such as the curve fitting described in U.S. patent application Ser. No. 14/817,989, entitled "Local Contrast Adjustment for Digital Images," filed Aug. 4, 2015, the entire contents of which is incorporated by reference herein. For some of the subsequent processing, such as the curve fitting, the data used is limited to the data that was acquired with the same RDAC settings. Thus, it may be desirable to deliver image frames both before and after re-adjustment of the operating biases so that subsequent processing elements have data from previous RDAC settings, as well as from the currently adjusted settings. For example a curve fitting process can limit data points to those that were acquired with identical operating bias (e.g., RDAC settings) for the photodetectors.

Figure 8:
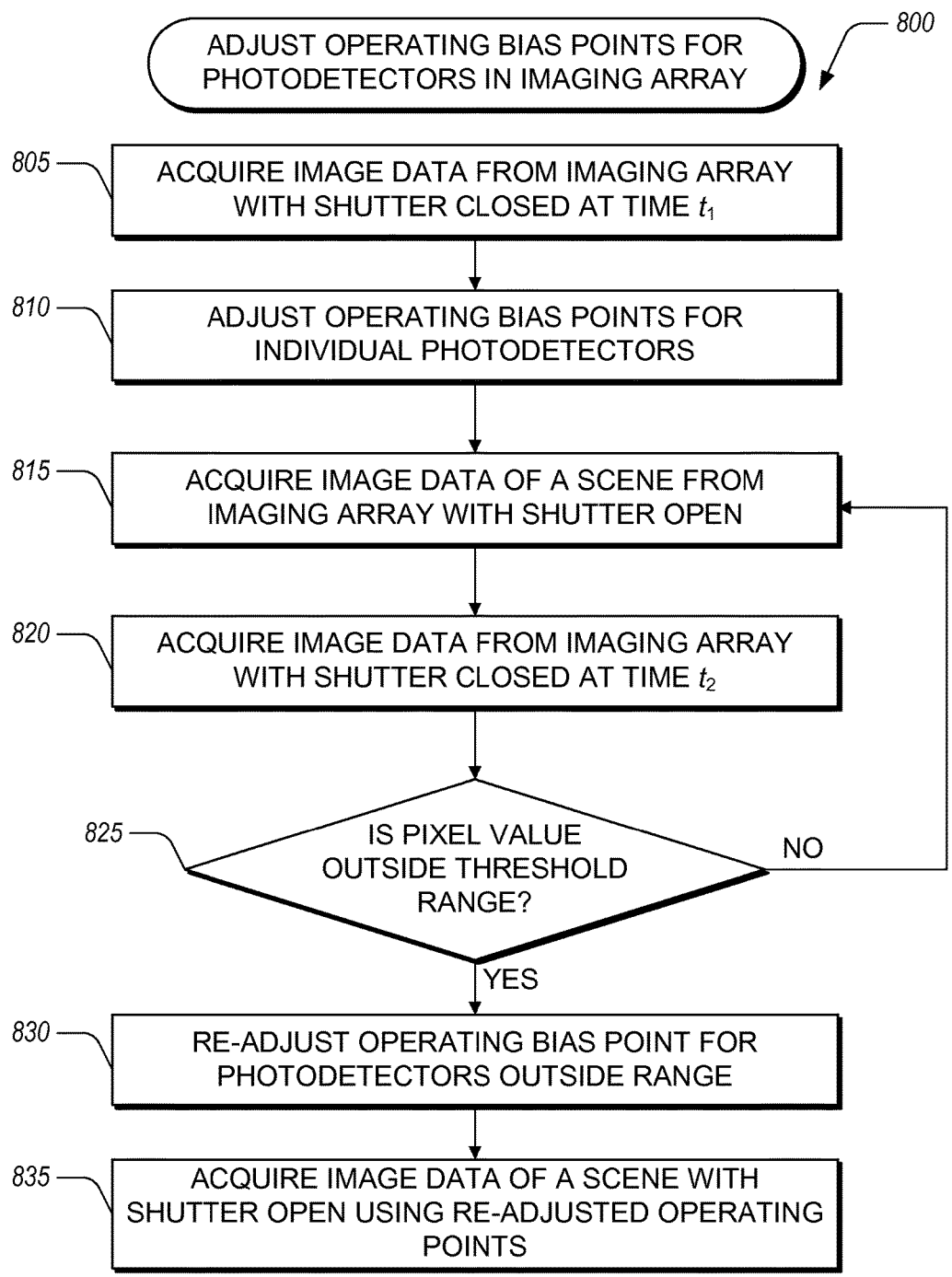
FIG. 8 illustrates a flow chart of an example method for adjusting operating biases for photodetectors in an imaging system based on acquired flat field images.

FIG. 8 illustrates a flow chart of an example method 800 for adjusting operating biases for photodetectors in an imaging system based on acquired flat field images. The method 800 can be implemented using one or more hardware components in an imaging system or image processing system. For ease of description, the method 800 will be described as being performed by the imaging system 100 described herein with reference to FIGS. 1A and 1B. However, one or more of the steps of the method 800 can be performed by any module or combination of modules in the imaging system 100. Similarly, any individual step can be performed by a combination of modules in the imaging system 100.

In block 805, the imaging system acquires image data from an imaging array with a shutter occluding the imaging array during a first time period, $t_1$. The image data can correspond to one or more flat field images, the flat field images comprising flat field intensity data provided by the photodetectors in the imaging array. The flat field images can correspond to a scene at a substantially uniform temperature, such as for an infrared imaging system. In certain implementations, the flat field images can correspond to images of the shutter at room temperature.

In block 810, the imaging system adjusts operating bias points for individual photodetectors to make signal outputs corresponding to the flat field intensity data to be within a threshold range of a data value assigned as a reference bias point. Adjusting an operating bias point can include, for example, adjusting a resistance of a resistor network associated with a particular photodetector. For example, a system controller can adjust an RDAC by one or more counts to increase or decrease the resistance of the RDAC. This can effectively alter a voltage at an input of an integrator circuit where voltage rails are used to apply a voltage across photodetectors in an imaging array. Other biasing elements can be adjusted as well. For example, global and/or focused biasing elements can be adjusted. A global biasing element can be an element that affects voltages applied to all photodetectors in an imaging array, for example. A focused biasing element can be an element that affects voltages applied to a subset of all of the photodetectors in an imaging array, for example (e.g., all photodetectors in a column or row of an imaging array). In some embodiments, adjusting an operating bias of an individual photodetector comprises adjusting a fine biasing element without adjusting a global or focused biasing element.

In block 815, the imaging system opens a shutter and acquires at least one image frame of a scene with the photodetectors operating with the adjusted operating bias points. The imaging system can utilize information about the operating bias points to determine physical parameters associated with the acquired scene data. For example, in an infrared camera the operating bias points can be used to perform thermography to determine temperatures of objects within the scene.

In block 820, the imaging system acquires image data from the imaging array with the shutter occluding the imaging array during a second time period after the first time period, and after acquiring the at least one image frame of the scene. In block 825, the imaging system determines if the measured flat field intensity data values from the second time have drifted outside of a threshold range around the reference bias point. If an individual photodetector has drifted outside the threshold range, the imaging system adjusts the operating bias point of the individual pixel to adjust the pixel data value to be closer to the reference bias level and within the threshold range in block 830.

It should be noted that the processes in blocks 820, 825, and 830 can be performed iteratively during the second time period, $t_2$. For example, a first flat field image can be acquired during the second time period, output signals for photodetectors can be compared to the threshold range, and operating bias points can be adjusted. A second flat field image can be acquired during the second time period, output signals for photodetectors can be compared to the threshold range, and operating bias points can be further adjusted, if one or more photodetectors are outside the threshold range. This process can be repeated until all or nearly all of the photodetectors have signal outputs within the threshold range for a flat field image.

In block 835, the imaging system acquires subsequent frames of scene image data at the re-adjusted operating points. The imaging system can utilize information about the re-adjusted operating bias points to update calculations for physical parameters associated with the acquired scene data.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. For example, the LUT described herein may be implemented using a discrete memory chip, a portion of memory in a microprocessor, flash, EPROM, or other types of memory.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computers readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A method for adaptive adjustment of operating biases of photodetectors of an imaging system comprising a shutter, an array of photodetectors, and detector electronic circuitry for reading out image data from the array of photodetectors, the method comprising:

acquiring, with the shutter closed to occlude the array of photodetectors, image data from the array of photodetectors during a first time period, the image data comprising an array of pixel values;

adjusting operating bias points for individual pixels, wherein an adjusted operating bias point for an individual pixel is configured to adjust image data acquired with the shutter closed so that a pixel value from the individual pixel is within a threshold range around a data value assigned to a reference bias point;

acquiring, with the shutter open to expose the array of photodetectors, image data of a scene at a time after the first time period, the image data acquired using the adjusted operating bias points;

acquiring, with the shutter closed to occlude the array of photodetectors, image data from the array of photodetectors during a second time period after the first time period, the image data comprising an array of pixel values;

re-adjusting the operating bias points for one or more individual pixels with pixel values outside the threshold range, and not re-adjusting the operating bias points for one or more individual pixels with pixel values not equal to the reference bias point but within the threshold range, wherein a re-adjusted operating bias point for an individual pixel is configured to adjust image data acquired with the shutter closed so that a pixel value from the individual pixel is within the threshold range around the data value assigned to the reference bias point; and acquiring, with the shutter open to expose the array of photodetectors, image data of a scene at a time later after the second time period, the image data acquired using the re-adjusted operating bias points.

2. The method of claim 1 further comprising repeating the steps of:
  acquiring image data with the shutter closed;
  re-adjusting the operating bias points for individual pixels; and
  acquiring image data with the shutter open using re-adjusted operating bias points.

3. The method of claim 1 further comprising converting image data to digital image data.

4. The method of claim 1, wherein adjusting an operating bias point comprises adjusting at least one component in a resistor digital-to-analog converter ("RDAC") network such that a finest adjustment level corresponds to a change of one least significant bit in the RDAC network.

5. The method of claim 4, wherein re-adjusting an operating bias point comprises adjusting the RDAC such that image data acquired with the shutter closed approaches the data value assigned to the reference bias point.

6. The method of claim 4 further comprising adjusting the RDAC such that image data acquired with the shutter closed approaches the data value assigned to the reference bias point, wherein image data that is above the threshold range is reduced to be less than the data value assigned to the reference bias point and image data that is below the threshold range is adjusted to be greater than the data value assigned to the reference bias point, such that a pixel value acquired with the adjusted RDAC settings is within one-half of the least significant bit in the RDAC network from the data value assigned to the reference bias point.

7. An imaging system comprising:
  an imaging array comprising an infrared focal plane array, the infrared focal plane array comprising an array of microbolometers, each pixel of the focal plane array including a microbolometer photodetector;
  a detector circuit comprising:
    a positive voltage rail;
    a negative voltage rail;
    at least one variable resistor network;
    an integrator comprising a signal input electrically coupled to an output of a microbolometer, a reference input electrically coupled to a integrator bias voltage source, and an output; and
    an analog-to-digital converter electrically coupled to the output of the integrator and configured to output digital data corresponding to an output signal of the integrator;
  a shutter configured to occlude the imaging array in a closed position and to expose the imaging array in an open position; and
  a system controller configured to adjust the variable resistor network to set an operating bias of the detector circuit using image data acquired when the shutter is in the closed position;
  wherein an individual microbolometer is electrically coupled to the positive voltage rail, the negative voltage rail, the at least one variable resistor network, and the integrator,
  the system controller is configured to adjust and re-adjust operating biases of one or more individual photodetectors with pixel values outside a targeted threshold that includes a reference bias level so that pixel values are within the targeted threshold, and not to re-adjust operating biases of one or more individual photodetectors with pixel values not equal to the reference bias level but within the targeted threshold, the reference bias level corresponding to a targeted digital output value of an analog to digital conversion of the integrator output value when image data is acquired with the shutter closed.

8. The imaging system of claim 7, wherein the at least one variable resistor network comprises a resistor digital-to-analog converter ("RDAC") network such that a finest adjustment level corresponds to a change of one least significant bit in the RDAC network.

9. The imaging system of claim 8, wherein the system controller is configured to determine initial operating bias points for individual photodetectors by setting each element of the at least one variable resistor network to adjust image data acquired with the shutter closed to be closer to the reference bias level.

10. The imaging system of claim 8, wherein the system controller is configured to re-adjust the operating bias points by adjusting only the RDAC network to bring the image data acquired with the shutter closed closer to the reference bias level.

11. The imaging system of claim 10, wherein the system controller is further configured to adjust the RDAC network to bring the image data acquired with the shutter closed for individual pixels closer to the reference bias level, wherein image data that is above a threshold range is reduced to be less than the reference bias level and image data that is below the threshold range is adjusted to be greater than the reference bias level.

12. The imaging system of claim 8, wherein at a plurality of points in time when the shutter is closed, the system controller is configured to:
  acquire multiple frames of image data; and
  analyze the acquired frames of image data based on previous RDAC settings and current RDAC settings.

13. The imaging system of claim 12, wherein the system controller is configured to determine an average of a number frames of image data.

14. The imaging system of claim 7, wherein the imaging system is a thermal imaging system and image data acquired with the shutter closed comprises a substantially uniform temperature scene at a temperature of the shutter.

15. The imaging system of claim 14, wherein the imaging system comprises an infrared camera core.

* * * * *